F. A. EMERY AND A. A. ADAMS.
WEIGHING MACHINE.
APPLICATION FILED MAR. 5, 1914.

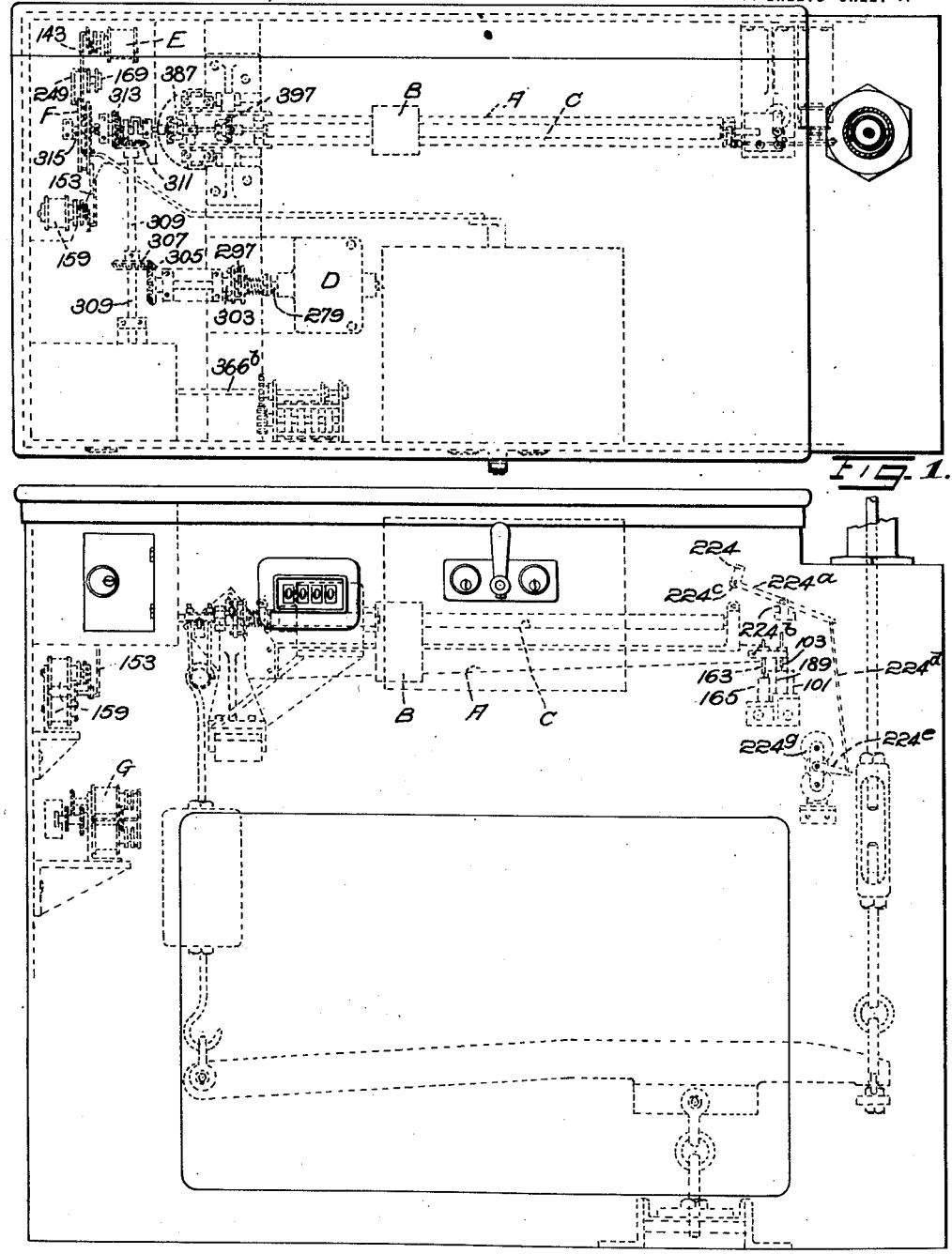

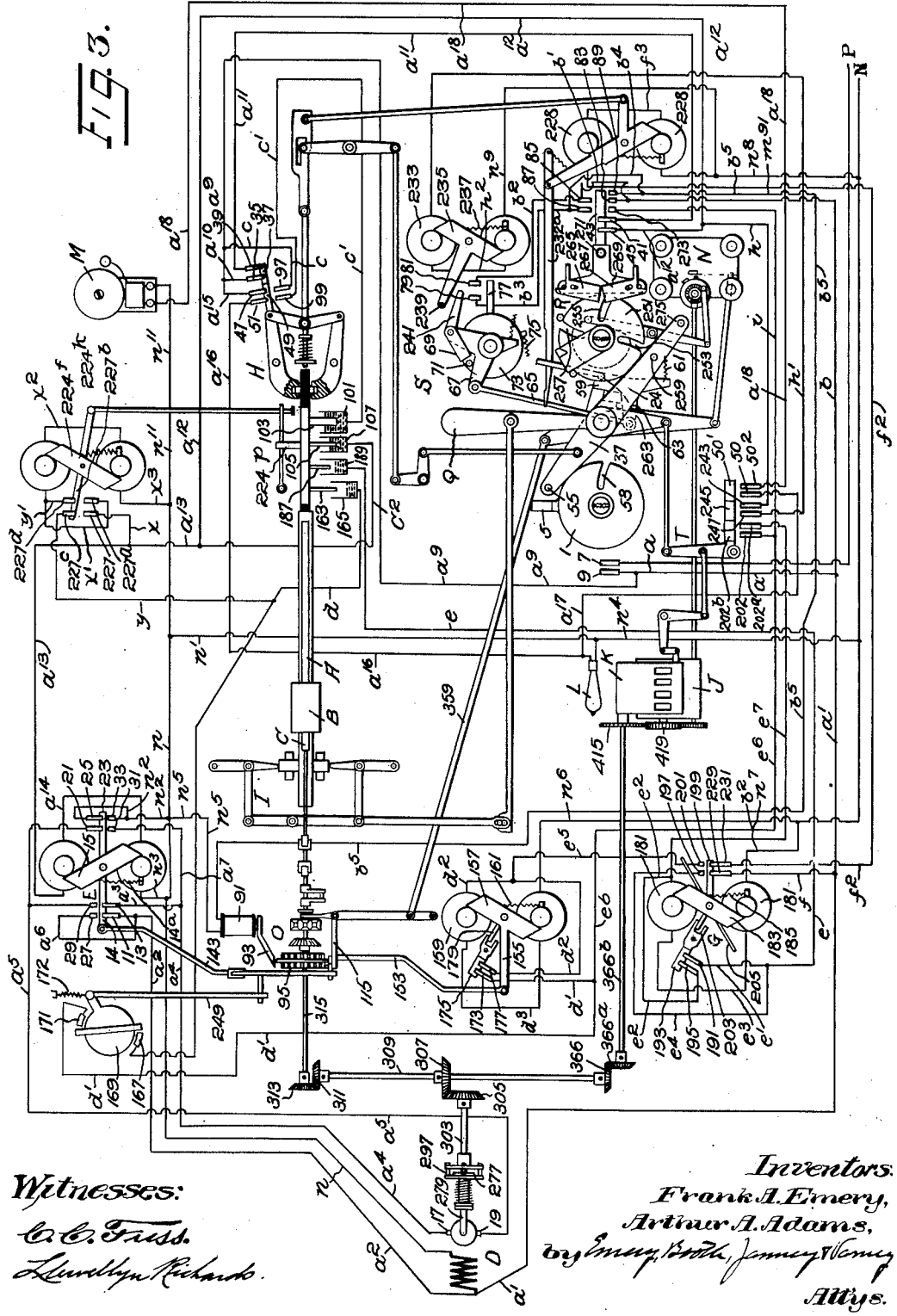

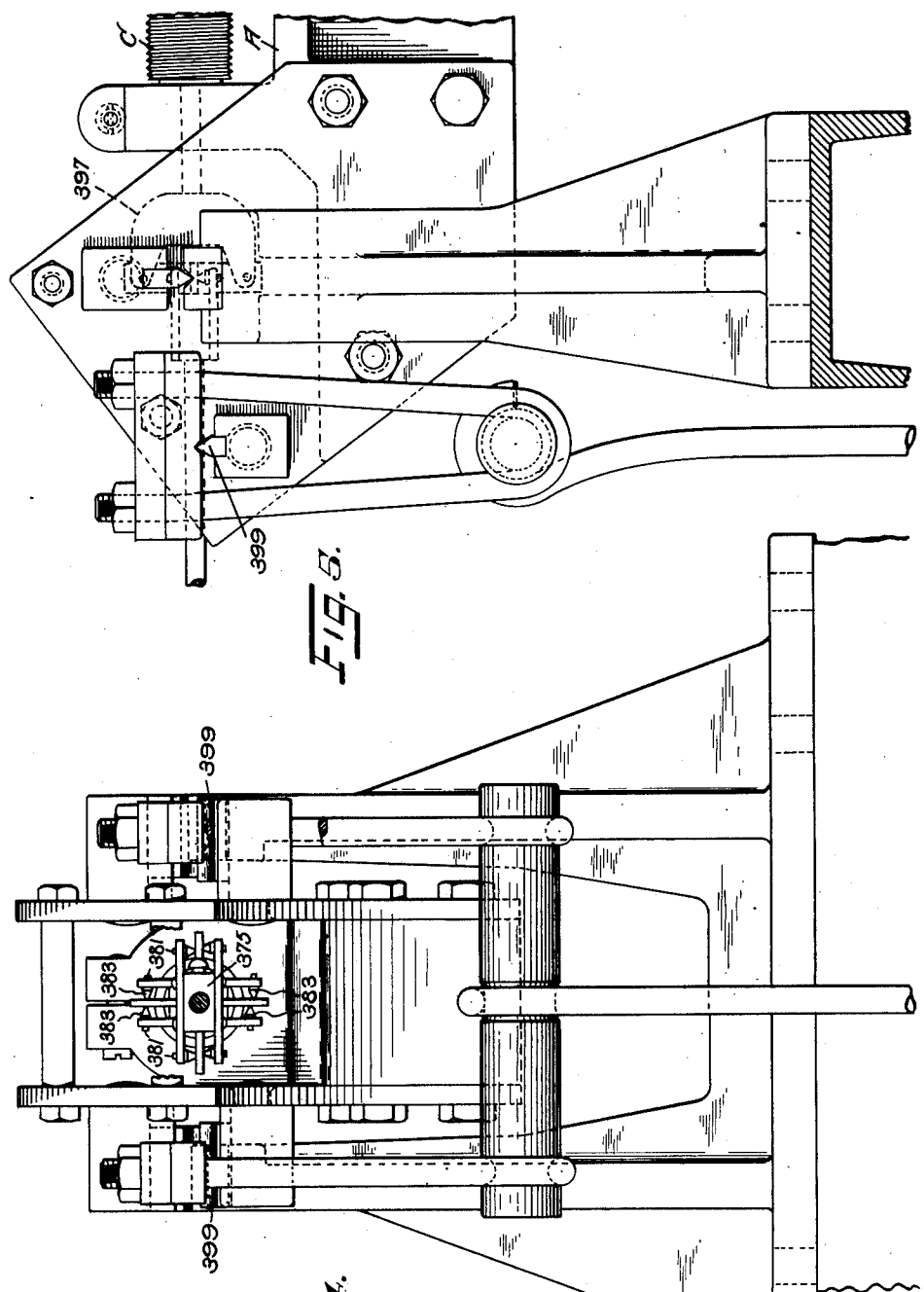

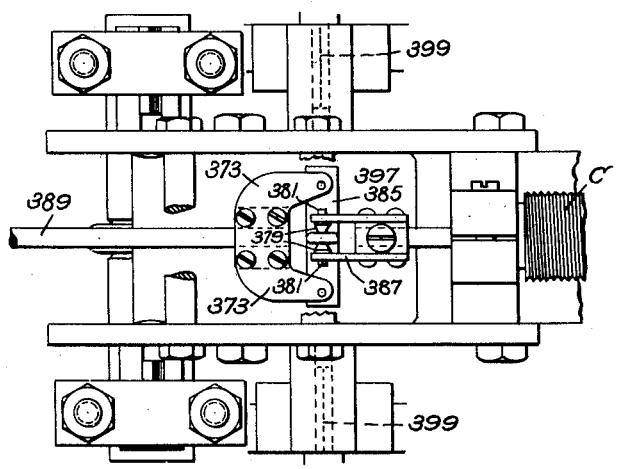
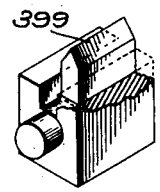
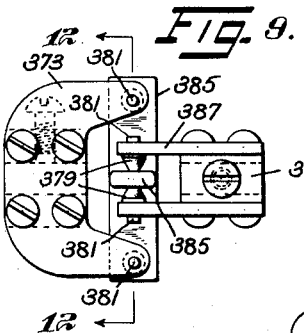
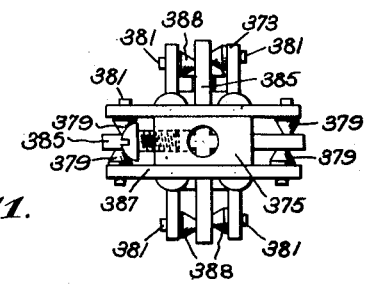
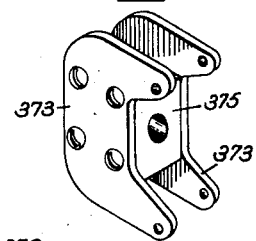
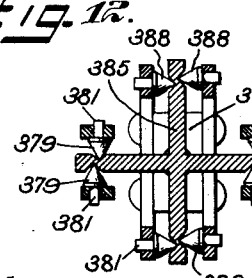
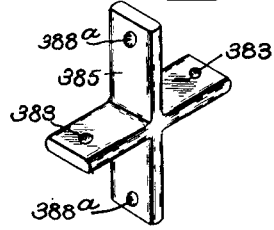
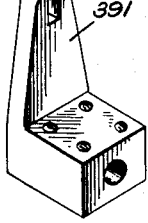

1,344,295.

Patented June 22, 1920.
11 SHEETS—SHEET 5.

Witnesses:
C. C. Fuss.
Llewellyn Richards

Inventors:
Frank A. Emery,
Arthur A. Adams,
by Emery, Booth, Janney & Varney
Attys.

F. A. EMERY AND A. A. ADAMS.
WEIGHING MACHINE.
APPLICATION FILED MAR. 5, 1914.
1,344,295.
Patented June 22, 1920.
11 SHEETS—SHEET 6.
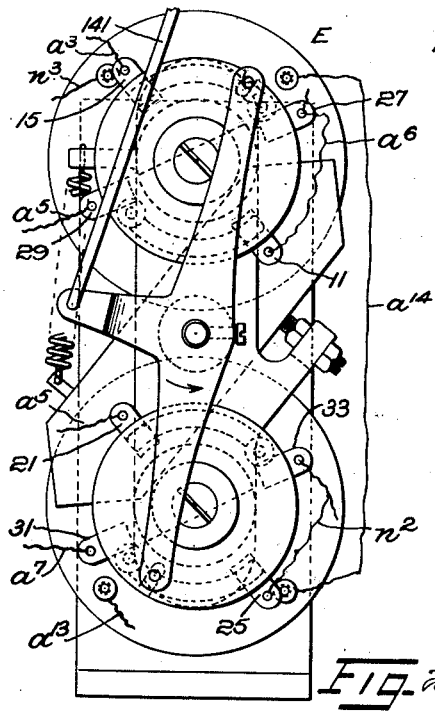
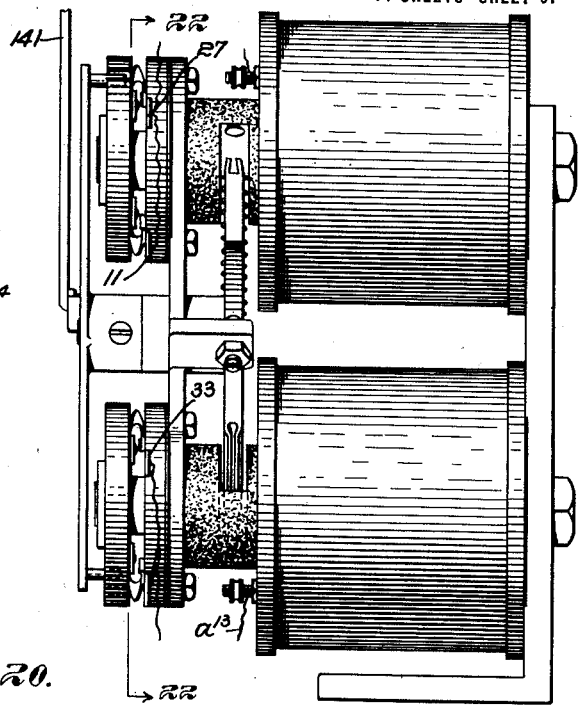
Fig. 20.
Fig. 21.
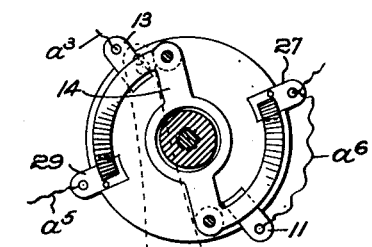
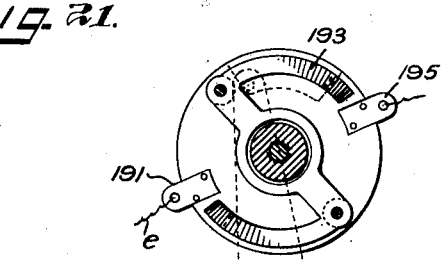
Fig. 22.
Fig. 23.
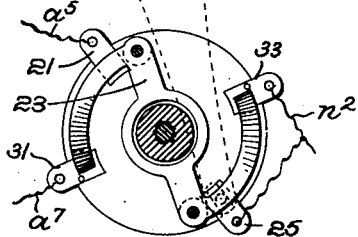
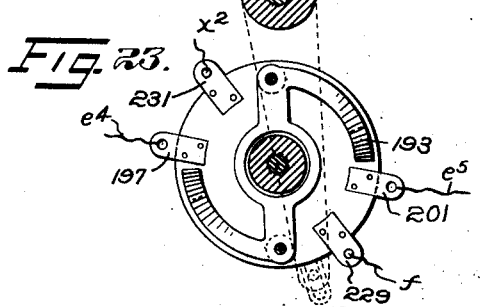
Witnesses:
Inventors
Frank A. Emery,
Arthur A. Adams,

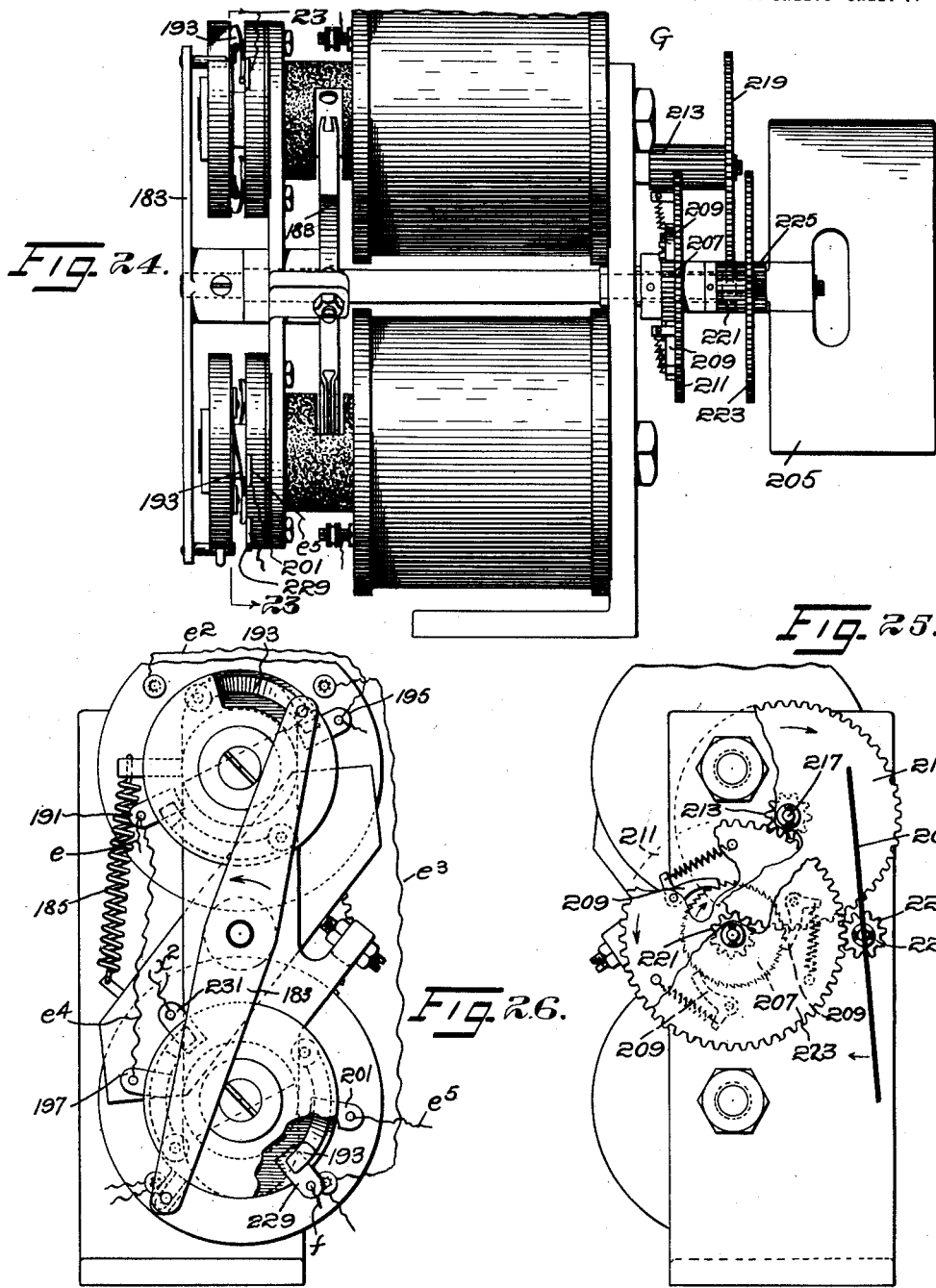

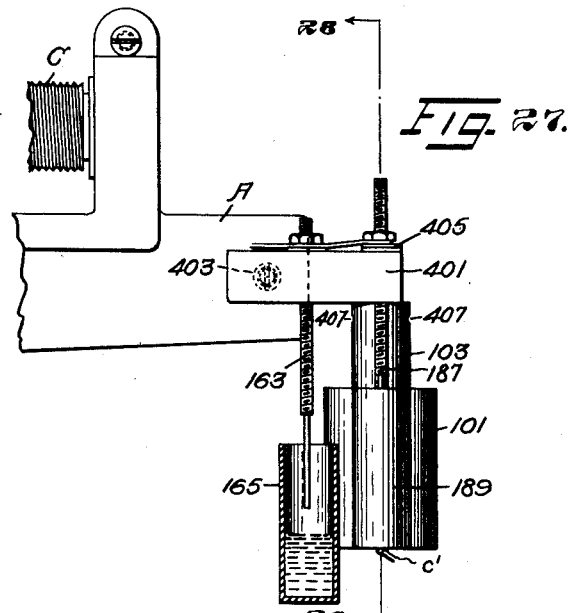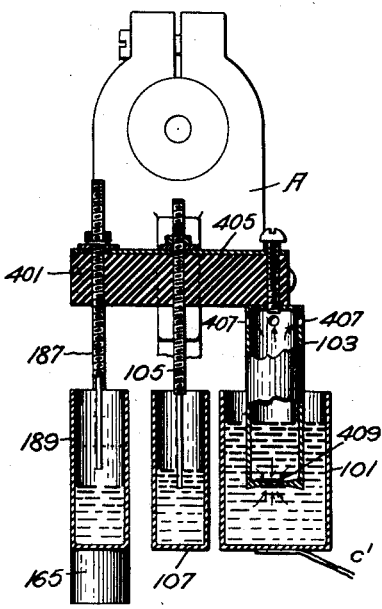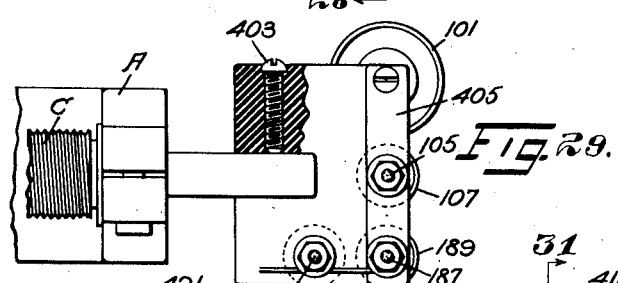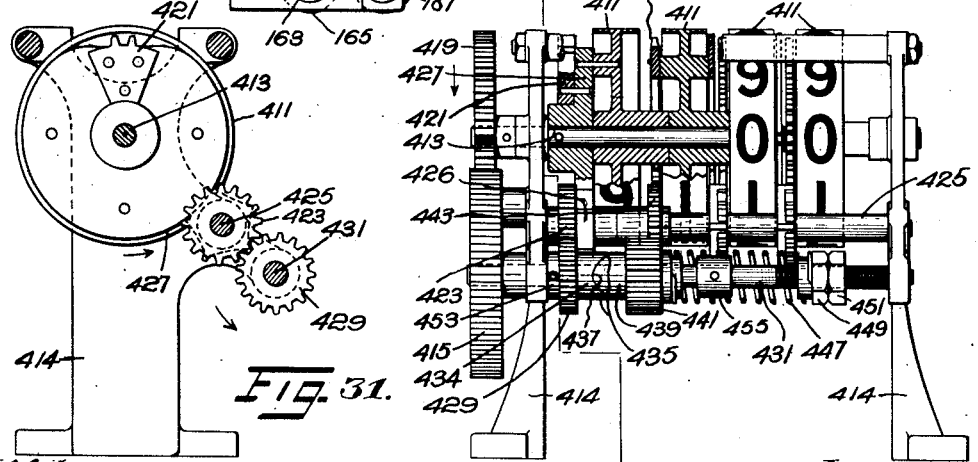

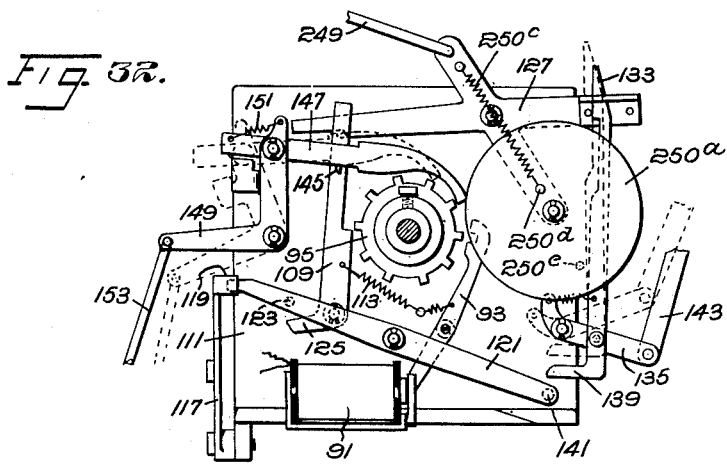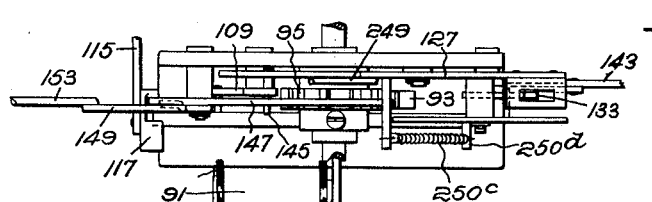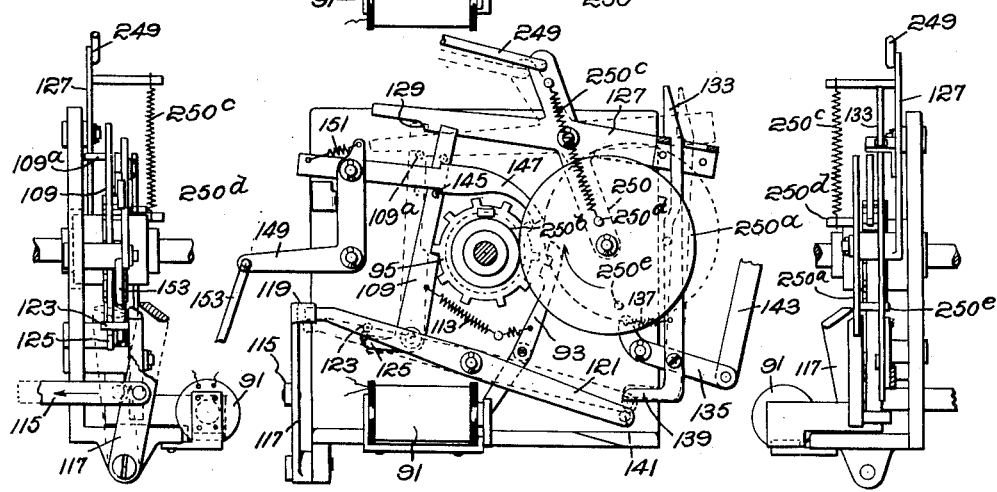

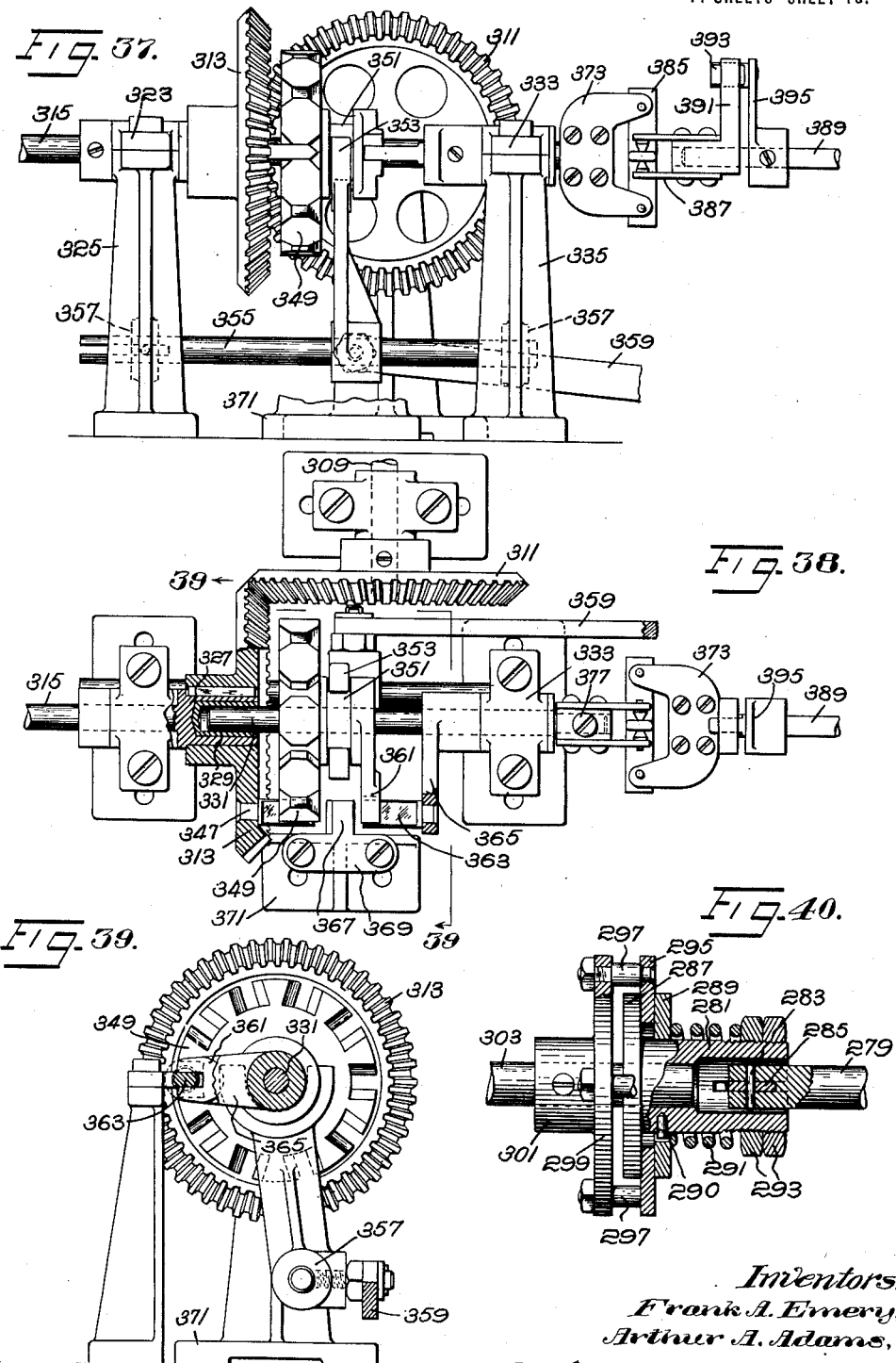

UNITED STATES PATENT OFFICE.

FRANK A. EMERY, OF QUINCY, AND ARTHUR A. ADAMS, OF BROOKLINE, MASSACHUSETTS, ASSIGNORS, BY MESNE ASSIGNMENTS, TO BOSTON SCALE AND MACHINE CO., OF BOSTON, MASSACHUSETTS, A CORPORATION OF MASSACHUSETTS.

WEIGHING-MACHINE.

1,344,295.  Specification of Letters Patent.  Patented June 22, 1920.

Application filed March 5, 1914.  Serial No. 822,560.

*To all whom it may concern:*

Be it known that we, FRANK A. EMERY and ARTHUR A. ADAMS, citizens of the United States, and residents, respectively, of Quincy and Brookline, both in the Commonwealth of Massachusetts, have invented an Improvement in Weighing-Machines, of which the following description, in connection with the accompanying drawings, is a specification, like characters on the drawings representing like parts.

This invention relates to weighing machines or scales, and among other objects provides a mechainism whereby a weighing operation once initiated will be automatically completed and the weight indicated and recorded in a shorter time than by previous machines.

The character of the invention may be best understood by reference to the following description of an illustrative embodiment thereof shown in the accompanying drawings, wherein:

Figure 1 is a plan of a casing containing the illustrative weighing machine embodying the invention, parts of the mechanism being shown in dotted lines;

Fig. 2 is a side elevation of Fig. 1;

Fig. 3 is a diagrammatic view showing various instrumentalities comprising the weighing machine and electrical connections between them;

Figure 15:
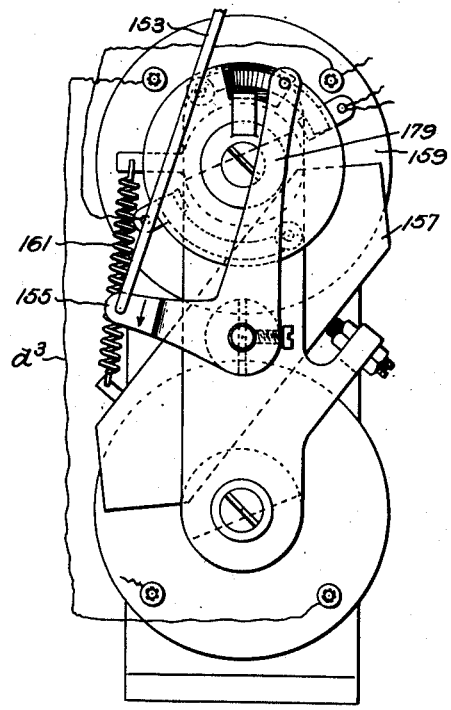
Figure 16:
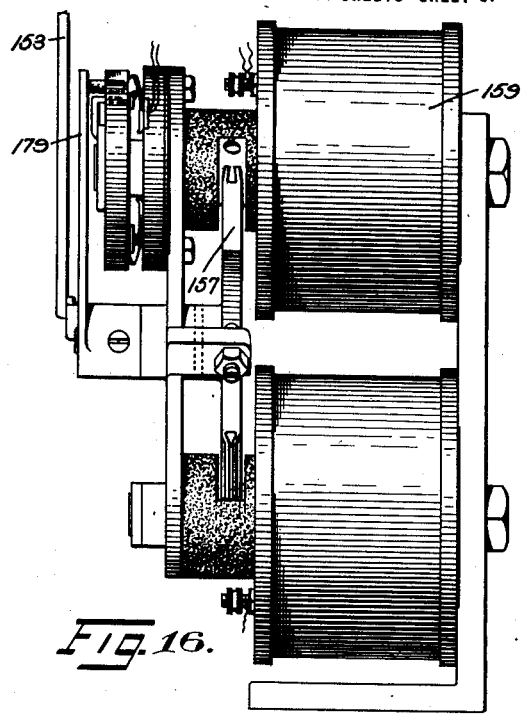
Figure 17:
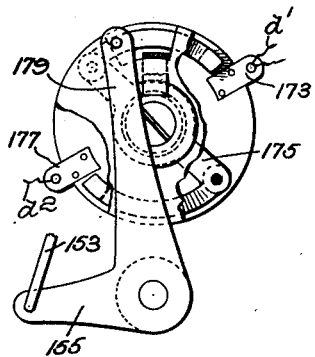
Figures 18, 19:
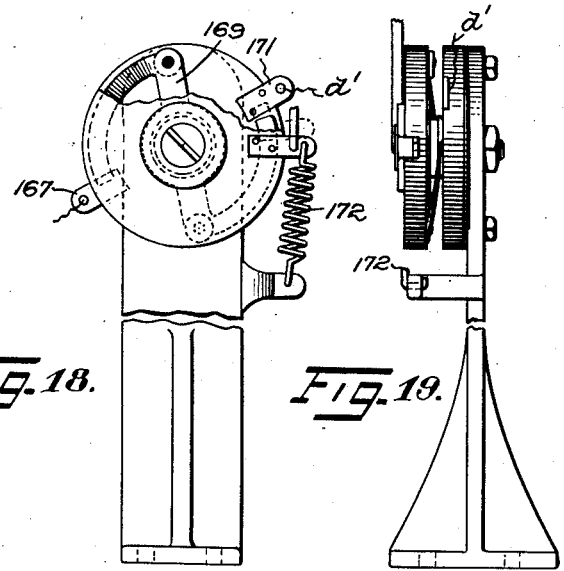
Figure 41:
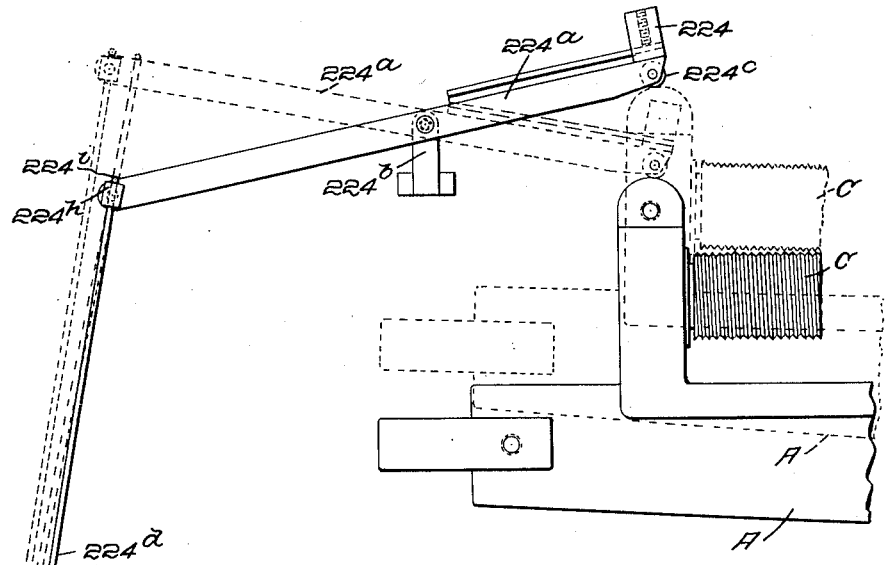
Figure 42:
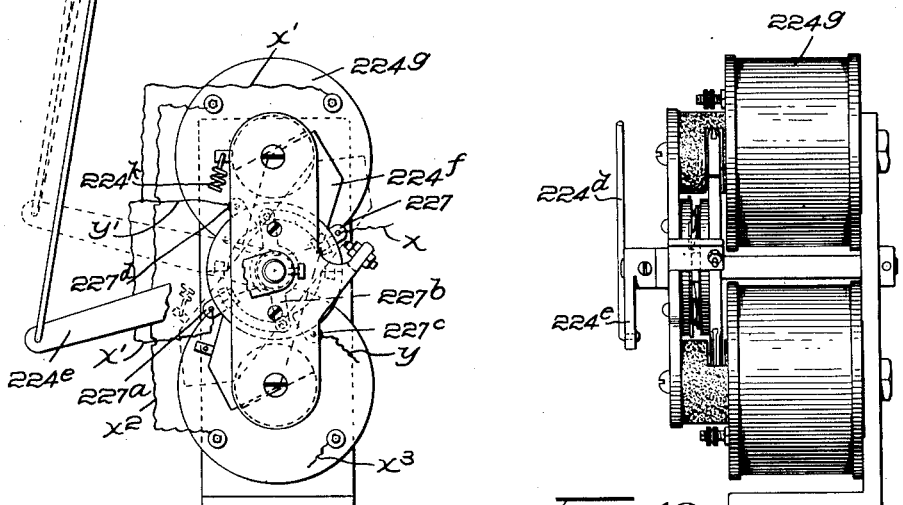

Fig. 4 on an enlarged scale is an end elevation of the weighing beam shown in Figs. 1 and 2;

Fig. 5 is a side elevation of the construction shown in Fig. 4;

Fig. 6 is a plan of the construction shown in Figs. 4 and 5;

Figs. 7 to 14 show details to be referred to;

Fig. 15 on an enlarged scale is an end elevation of an escapement motor shown in Figs. 1 and 2;

Fig. 16 is a side elevation of the motor shown in Fig. 15;

Fig. 17 is a detached view of parts shown in Fig. 15 in a different position;

Fig. 18 is an end elevation of a controlling switch for the escapement motor circuit;

Fig. 19 is a side elevation of the switch shown in Fig. 18;

Fig. 20 is an end elevation of a reversing switch motor for the poise motor circuit;

Fig. 21 is a side elevation of the motor shown in Fig. 20;

Fig. 22 is a section taken on line 22—22 of Fig. 21;

Fig. 23 is a section taken on line 23—23 of Fig. 24;

Fig. 24 on an enlarged scale is a side elevation of a timer switch mechanism shown in Fig. 2;

Fig. 25 is an end elevation of the timer switch mechanism shown in Fig. 24 looking toward the left of said figure;

Fig. 26 is an end elevation of the timer switch mechanism shown in Fig. 24 looking toward the right of said figure;

Fig. 27 is a side elevation of a portion of the weighing beam and contacts coöperating therewith;

Fig. 28 is a section taken on line 28—28 of Fig. 27;

Fig. 29 is a plan of the devices shown in Figs. 27 and 28;

Fig. 30 is a view partly in side elevation and partly in section of an indicator;

Fig. 31 is a section taken on line 31—31 of Fig. 30;

Fig. 32 is a view partly in section and partly in elevation of an escapement feed mechanism in the transmission for the poise shaft;

Fig. 33 is a plan of the mechanism shown in Fig. 32;

Fig. 34 is an elevation of the mechanism shown in Fig. 32 looking toward the right of said figure;

Fig. 35 is a view similar to Fig. 32 showing the parts in a different position;

Fig. 36 is an end elevation of the mechanism shown in Fig. 32 looking toward the left of said figure;

Fig. 37 is a side elevation of a clutch and universal driving connections in the transmission for the poise screw shaft;

Fig. 38 is a view partly in plan and partly in section of the devices shown in Fig. 37;

Fig. 39 is a section taken on line 39—39 of Fig. 38;

Fig. 40 is a view partly in section and partly in elevation of a friction driving device interposed in the transmission from the driving motor to the poise screw shaft;

Fig. 41 is a side elevation of a beam influencing device and a controlling motor therefor; and Fig. 42 is an end elevation of the motor shown in Fig. 41.

Referring to the drawings and to the embodiment of the invention which is there shown for illustrative purposes, a more ready understanding of the same may be obtained by reference first to the general diagrammatic showing in Fig. 3 wherein there is disclosed in conventional form a group of instrumentalities with electrical and other connections therefor.

Some of these instrumentalities are substantially the same as those shown and described in our copending applications, Serial No. 540,937 filed Jan. 31, 1910, and Serial No. 781,420 filed July 26, 1916, and other instrumentalities will be described more fully hereinafter in connection with details thereof shown in the remaining figures of the drawings.

In Figs. 1 and 2 there is represented diagrammatically a weighing beam A connected by a system of links and levers, such for example as disclosed in said application Serial No. 540937 to the platform (not shown) of a weighing scale.

On the beam A is mounted a poise B adapted to be fed along the beam by a screw shaft C. In our said copending applications the shaft is actuated throughout its drive by a step-by-step feed. Obviously the poise cannot be caused to travel along the beam and arrive at the balance point as quickly by a step-by-step feed as by a continuous feed.

An important feature of the present invention relates to means for driving the poise by a continuous feed movement. To this end there is provided a motor, typified herein as an electric motor D (Fig. 3) having a torque continuously tending to rotate the same. The poise is fed by this motor continuously outward beyond the beam balance point.

To prevent excessive overtravel of the poise outward beyond the balance point a beam influencing device $p$ is provided tending to press the beam downward during the outward travel of the poise, but released from the beam before the poise reaches the balance point to avoid interference with the true balancing of the beam.

After the poise passes the balance point the beam tilts downward. This actuates a reverse switch E and throws into operation an escapement mechanism F which coöperates with the motor D to produce a very rapid step-by-step inward travel of the poise. This rapid travel is continued until the poise is within a short distance of the balance point, whereupon to prevent overtravel of the poise inward beyond the balance point the frequency of the step beats is reduced so that each step occupies a second or other appropriate interval.

The change from the rapid step feed to the slow step feed is controlled by the beam and a timer motor switch mechanism G. This timer mechanism has the dual function of causing the final steps of the poise to be made at a slow speed and also of making certain that the beam is not locked and a second weighing operation is not initiated until a predetermined length of time has elapsed after the time of the arrival of the poise at the position of balance.

The beam is locked by a mechanism H which is rendered effective by the timer mechanism G after the said predetermined length of time has passed.

To prevent any lateral displacement or objectionable disturbance of the beam from the jar incidental to the placing of a load on the platform or other cause, there is provided adjacent the fulcrum of the beam a locating device I, such for example as is described in our copending application, Serial No. 781,420.

To indicate the weight there is provided an indicator J which is driven in opposite directions in accordance with the movement of the poise. The weight indicator may be provided with a shutter K which is opened at appropriate times to reveal the indicator. This reading is facilitated by an electric lamp L. The completion of the weighing operation is announced by a gong M.

To record the reading of the weight indicator J, a printing unit N is provided driven in unison with the indicator.

A clutch O is interposed in the transmission from the motor D to the poise screw shaft to control the starting and stopping of the rotation of said shaft.

To initiate a weighing operation there is provided a starting mechanism S which in the main is similar to that disclosed and described in our said copending application, Serial No. 540,937. It is therefore unnecessary to describe this mechanism in detail herein, but it will suffice to say that it includes a main operating handle Q which may be thrown to the left (Fig. 3) to initiate a weighing operation after being released by a key-controlled locking device 1.

An adjuster mechanism R is provided for calibration of the scale and is controlled by a key and locking device substantially similar to those described in our said copending application, Serial No. 540,937.

Having referred in general to various instrumentalities comprising the weighing machine embodying the invention, we will now proceed to describe the circuits and connections whereby the coöperation of said instrumentalities is effected. The turning of the unlocking device 1 for the handle is utilized to connect the machine with an outside source of electricity. To this end said device is provided with a bridge contact 5 for connecting fixed contacts 7 and 9, the former being connected to a wire P.

To supply current to the field coils of the poise motor D the fixed contact 9 is connected by a wire $a$ with a wire $a'$, connected in turn to the field coils of said motor, said coils being connected by a negative wire $n$ with a wire $n'$, connected in turn to the main negative wire N.

To supply current to the armature of said motor a wire $a^2$ is tapped from the motor field supply wire $a'$ and is connected to a fixed contact 11 at the reverse motor E, said fixed contact being adapted to be connected to a fixed contact 13 by a switch 14 on an armature 15 of said motor. A spring $14^a$ causes said switch to connect said contacts 11 and 13 when the motor is deënergized. Contact 13 is connected by a wire $a^3$ with branch wires, one of which, $a^4$ is connected to one of the terminals 17 of the armature of said motor. Another terminal 19 of said armature is connected by a wire $a^5$ with a fixed contact 21 at the reverse motor E, adapted to be connected by a switch 23, also controlled by said reverse motor, with a fixed contact 25, the latter being connected by a negative wire $n^2$ with the negative line $n$ referred to.

With the reverse motor deënergized, its armature is rocked by the spring $14^a$, thereby causing the switch arm 14 to connect the fixed contacts 11 and 13 and causing the switch arm 23 to connect the fixed contacts 21 and 25, as shown in Fig. 3. Then the current passes through the wire $a^2$, through the switch 14, wires $a^3$ and $a^4$ to the armature of the poise motor, thence through the wire $a^5$ and switch 23 to the negative line. This causes the motor to have a torque in a direction to feed the poise outward along the beam.

We will next describe a circuit controlled by the reverse motor E for reversing the motor D and causing the poise to travel inward on the beam. To this end a wire $a^6$ is tapped from the motor armature supply wire $a^2$ and is connected to a fixed contact 27 at the reverse motor adapted to be connected by the switch 14, referred to, to a fixed contact 29, said fixed contact being connected to the wire $a^5$ referred to. The wire $a^4$ referred to is also connected by a wire $a^7$ with a fixed contact 31 at the reverse motor adapted to be connected by the switch 23 with a fixed contact 33 connected in turn to the wire $n^2$ leading to the main negative line.

When the reverse motor is energized by a circuit more fully hereinafter described, the switches 14 and 23 are rocked to connect the fixed contacts 27 with 29, and 31 with 33. Then the current passes from wire $a^2$ through wire $a^6$, switch 14 and wire $a^5$, through the motor armature, thence through wire $a^4$, wire $a^7$ and switch 23 to the negative line $n^2$. With this circuit in operation the motor is driven with a torque in a direction to feed the poise inward on the beam.

We will next describe a circuit for energizing the reverse motor prior to the initiation of a weighing operation to produce an inward feed torque of the poise motor. To this end a wire $a^9$ is led from the positive wire $a$ at the starting mechanism to a wire $a^{10}$ connected to a fixed contact 35 adjacent the beam lock H and adapted to be connected by a switch contact 37 with a fixed contact 39, the latter being connected by a wire $a^{11}$ with a fixed contact 41 at the adjuster mechanism R. This fixed contact is adapted to be connected by a switch 43 with a fixed contact 45, the latter being connected by a wire $a^{12}$ with a wire $a^{13}$ connected in turn to one of the coils of the reverse motor E. This coil is connected by a wire $a^{14}$ with the other coil of said motor, the latter coil being connected by a wire $n^3$ with the wire $n$ leading to the main negative line N.

When the unlocking device 1 is turned to cause its bridge contact to connect the fixed contacts 7 and 9 and the beam lock controlled switch 37 is closed, the magnet of the reverse motor E will be energized through the circuit described. This will cause its switches 14 and 23 to be rocked to positions completing the circuit which produces a torque on the poise motor tending to feed the poise inward on the beam. When the beam lock is released on the initiation of a weighing operation the switch 37 is opened and the circuit just described is broken. The opening of the lock, however, immediately closes a circuit (to be described) through the beam to the reverse motor and thereby the energization of said motor is continued.

The closing of the unlocking device switch 5 also lights the lamp L which illuminates the indicator. The circuit to the lamp comprises a wire $a^{15}$ tapped off of the wire $a^{10}$ at the beam lock, said wire $a^{15}$ being connected to a fixed contact 47 at the beam lock adapted to be connected by a switch 49 controlled by said lock, as more fully hereinafter described, with a fixed contact 51. This fixed contact is connected by a wire $a^{16}$ with the lamp, the latter being connected by a wire $n^4$ with the main negative wire N.

The circuit to the gong M comprises a wire $a^{17}$ tapped off the lamp wire $a^{16}$ and connected to a fixed contact 50 at the switch T adapted to be connected by a bridge contact 50' with a switch contact $50^2$, said fixed contact in turn being connected by a wire $a^{18}$ with the gong M, which is connected by a wire $n''$ with the wire $n'$ leading to the main negative line.

From the above description it will be apparent that when the unlocking device 1 is operated to cause its switch contact to connect the fixed contacts 7 and 9 a torque will be placed on the poise motor tending to feed the poise inward and the indicator lamp will be lighted.

When the unlocking device 1 has been turned to complete the circuits described a radial slot 53 therein will be in registration with a pin 55 on an arm 57 connected with the main operating handle Q, as disclosed in our copending application Serial No. 540,937. The handle Q is then free to be rocked in a contra-clockwise direction (Fig. 3) to initiate a weighing operation. This rocking movement of the handle performs a series of mechanical operations. It releases the beam lock H and the beam locating device I, closes the indicator shutter K, throws the clutch O, unlocking the poise screw shaft and connecting the latter with the poise motor D, opens the switches 37 and 49 in the reverse motor, lamp and gong circuits, and closes the switch T for several of the circuits to be described.

When the handle Q has completed its rocking movement to the left to initiate a weighing operation it is automatically prevented from being rocked to the right by a lock dog 59 actuated by a spring 61 substantially as shown in our copending application Serial No. 540,937. The rocking of the dog to lock the handle is utilized to close the switch in the starting circuit for initiating the weighing operation. To this end the dog 59 is provided with a branch arm 63 connected by a link 65 with one arm of a bell crank 67, the other arm of which carries a dog 69 adapted to engage a pin 71 on a rocking disk 73, said disk being urged in a clockwise direction by a spring 75. When the handle locking dog rocks in a contra-clockwise direction to lock the handle it rocks the bell crank 67 and through the dog 69 and pin 71 the disk 73 is turned in a contra-clockwise direction. The disk is provided with a switch arm 77 which, when the disk is so turned, connects fixed contacts 79 and 81 in the starting circuit.

This starting circuit comprises a wire $b$ leading from the positive wire $a$ to a fixed contact 83 at the adjuster mechanism connected in turn by a shunt wire $b'$ with a fixed contact 85 connected in turn by a wire $b^2$ with the fixed contact 81, referred to, at the starting switch. The other fixed contact, 79, at the starting switch is connected by a wire $b^3$ with a fixed contact 87 adapted to be connected by a shunt wire $b^4$ with a fixed contact 89, the latter being connected by a wire $b^5$ with a latch magnet 91 for the escapement mechanism F, referred to, said magnet being connected by a negative wire $n^5$ with the main negative line.

The fixed contacts 83, 89 are adapted to be connected by the adjuster switch 43 and the fixed contacts 85 and 87 are adapted to be connected by said adjuster switch 43 for purposes hereinafter described.

As stated, on the turning of the handle unlocking device 1 a torque is placed on the poise motor tending to feed the poise inward. Rotation of the poise shaft is prevented, however, by a latch 93 controlled by said latch magnet 91 and coöperating with an escapement wheel 95 fast on the motor driven shaft, as more fully hereinafter described. The turning of said device 1 and the closing of the bridge contact 5 and the starting circuit switch 77 completes the circuit which energizes the magnet 91 and thereby attracts the latch 93 and releases the same from the escapement wheel 95, permitting the poise motor torque to become effective to feed the poise inward on the beam.

The operating handle Q when rocked to initiate a weighing operation releases the beam lock from the beam and in so doing opens the switch 49 in the lamp and gong circuit. As a result the lamp is extinguished.

The beam circuit to the reverse motor comprises a wire $c$ tapped off the wire $a^{10}$ leading to the reverse motor, said wire $c$ being connected to a fixed contact 97 adjacent the beam lock controlled switch 49, said fixed contact being adapted to be connected by said switch with a fixed contact 99. This fixed contact is connected by a wire $c'$ with a fixed mercury cup contact 101 adjacent the end of the poise beam and coöperating with a needle contact 103 on and depending from said beam. The current passes from the wire $c'$ through this cup and needle and thence to a second needle 105 also on and depending from said beam and coöperating with a fixed mercury cup contact 107. This contact is connected by a wire $c^2$ to the wire $a^{13}$, referred to, leading to the reverse switch motor coils.

The needle contacts 103, 105 are in their cups when the beam is locked in a position of balance. If the beam lock H is released the switch 49 controlled thereby connects the fixed contacts 97 and 99, completing the circuit through the beam to the coils of the reverse switch motor. As a result its armature will hold the switches 14 and 23 rocked in positions to complete the circuit creating a torque on the poise motor tending to cause the poise to travel inward.

When the beam is tilted upward the needles 103, 105 are out of their cups and the circuit to the reverse switch motor is broken, thereby deënergizing the latter and releasing its armture to the action of its spring. This rocks the switches 14 and 23 to reverse the direction of the current through the armature of the poise motor and thereby change the direction of torque on said motor and cause the poise to travel outward on the beam.

The poise is fed very rapidly by the continuous rotation of its screw from its inward position to its outward position beyond the balance point. The movement is so rapid as compared to the sluggish tilting of the beam that the poise necessarily travels beyond the balance point. When the beam tilts downward on the outward movement of the poise the needle contacts 103, 105 are again immersed in their cups and the circuit is again completed to the reverse switch motor, thereby energizing the latter and causing the switches 14 and 23 to be rocked and change the direction of current through the armature of the poise motor, reversing the motor and causing the same to have a torque tending to feed the poise inward on the beam.

The inward travel of the poise is not by a continuous movement but is a very rapid step-by-step or escapement movement until the poise almost reaches the balance point, whereupon the speed of the step movement is reduced.

We will now describe mechanism for effecting this inward step-by-step travel, referring more particularly to Figs. 3 and 32
35 to 36.

As stated, there is now a torque on the motor tending to turn the poise shaft in a direction to feed the poise inward. To permit the shaft to be rotated step-by-step
40 under this torque the escapement wheel 95, referred to, is provided with a dog 109 (Fig. 32) pivoted on a plate 111 appropriately supported off of the beam within the scale casing. This dog is urged toward the ratchet wheel by a spring 113 connected to said dog and to a pin on said plate and is intermittently released from said wheel to permit said step-by-step movement.

The dog 109 should be rocked out of engagement with the escapement wheel 95 at the commencement of a weighing operation in order to avoid interference by said dog with a continuous rotation of the escapement wheel on the initial in-feed of the poise. The dog may be so rocked by the movement of the main operating handle Q in initiating a weighing operation. To this end the handle is connected by an arm 115 to a lever 117 (Fig. 32) fulcrumed on said plate 111. This lever has a flange 119 overlying an end of a lever 121 transverse to said lever 117 and fulcrumed intermediate its ends on the plate 111. This lever 121 is provided with a pin 123 projecting from a face thereof adapted to engage a toe 125 on the dog 109. When the operating handle Q is rocked to the left (Fig. 3) the lever 121 will be rocked by the lever 117 in a contra-clockwise direction (Fig. 35), thereby causing its pin 123 to engage the toe 125 of the dog 109 and rock the latter out from engagement with the escapement wheel. In the course of this movement the flange 119 wipes across the end of the lever 121 so that the latter is free to rock back up to its full line position (Figs. 3, 32 and 35) where it is in a position to avoid interference with reciprocation of said dog 109, as more fully hereinafter described. To hold the dog at times out of engagement with the escapement wheel 95, a latch lever 127 is pivoted on the plate 111 and has a shoulder 129 adapted to engage a pin 109ª projecting from the dog 109. To hold the latch lever 127 at times up out of range with the dog pin 109ª there is provided a latch 133 pivoted on a link 135, the latter in turn being pivoted on the plate 111. The latch 133 projects through an aperture in the end of the latch lever 127 and has a shoulder adapted to engage said lever to rock it downward in the position shown in Fig. 35. The latch 133 is urged in a contra-clockwise direction by a spring 137 connected to said latch and to a heel of the link 135. The latch 133 has a toe 139 adapted to be engaged by a pin 141 on the lever 121.

When the handle Q is operated to initiate a weighing operation not only will the lever 121 cause the dog 109 to be rocked out of engagement with the escapement wheel 95 but also its pin 141 will engage the latch toe 139 and rock the latch in a clockwise direction (Fig. 35), thereby releasing the latch lever 127 which will rock in a contra-clockwise direction and cause its shoulder 129 to engage the dog pin 109ª and lock the dog out of engagement with the escapement wheel. The dog will remain locked out of engagement with the escapement wheel until the reverse switch motor changes the direction of feed of the poise and causes the same again to start to travel inward. The rocking of the reverse switch in effecting a change of feed from inward to outward is utilized to move the latch 133 back to a position in readiness to rock the latch lever 127 up in its position shown in Fig. 35. To this end the latch carrying link 135 is connected by a link 143 with the armature of the reverse motor. When the reverse motor is deënergized to cause the poise to commence to travel outward, its armature is rocked by its spring and through the link 143 moves the latch 133 up to its position shown in dotted lines in Fig. 32. When the reverse motor is energized on the arrival of the poise at its outward limit of travel its armature is rocked in an opposite direction, thereby drawing the latch 133 down to its position shown in full lines in Fig. 35. This rocks the latch lever 127 in a clockwise direction and causes it to release the dog 109. The latter is now drawn by its spring 113 into engagement with the escapement wheel 95 and prevents the turning of the ratchet under the poise motor torque to feed the poise inward.

To permit step movements of the escapement wheel under the action of the poise motor torque the dog 109 (Fig. 32) is rocked at intervals out of engagement with the escapement wheel. To this end said dog is provided with a pin or lug 145 adapted to be engaged by a shoulder of a finger 147 having a curved free end for engagement with teeth of the ratchet wheel and its rear end pivoted to one arm of a bell crank 149 pivoted on the plate 111. The finger 147 is normally urged toward the escapement wheel 95 by a spring 151 connected to a toe on said bell crank and the rear end of said finger. To rock the bell crank it is connected by a rod 153 with an arm 155 (Fig. 3) adapted to be rocked by an armature 157 of an escapement controlling motor 159. The armature of said motor is rocked in a contra-clockwise direction on the energization of said motor, and in a clockwise direction on the deënergization of said motor by a spring 161. Current is supplied to energize said escapement motor from the circuit leading to the beam needle contact 103. This current passes from said needle along said beam through a needle contact 163 depending from said beam and coöperating with a mercury cup contact 165. This contact is connected by a wire $d$ with a fixed contact 167 adapted to be connected by a cutout switch 169 (Figs. 3, 18 and 19) with a fixed contact 171. A spring 172 tends to open said switch. The fixed contact 171 is connected by a wire $d'$ with a fixed contact 173 at the escapement motor, said fixed contact being adapted to be connected by a bridge contact 175 with a fixed contact 177, the latter being connected by a wire $d^2$ with one of the coils of said escapement motor. This coil is connected by a wire $d^3$ with the other coil of said motor, the latter coil being connected by a wire $n^6$ with the main negative line.

The bridge contact 175 is shown diagrammatically in Fig. 3 as mounted on an arm pivoted between its ends, one of which is bifurcated to receive a pin 179 moved by the armature 157 of the escapement motor.

When the escapement motor bridge contact 175 is in the position shown in Fig. 3 the circuit will be completed to the coils of the escapement motor, thereby energizing the latter and causing its armature 157 to rock in a contra-clockwise direction. This armature in so rocking will actuate its arm 155 and through the rod 153 will rock the bell crank 149 and cause the finger 147 to drag the dog 109 out from engagement with the escapement wheel 95, thereby releasing said escapement wheel to the poise motor torque. As the finger 147 is so drawn by the escapement motor its curved end will drag over the teeth of the escapement wheel and lift said finger up out of engagement with the pin 145 of the dog 109. This will automatically release said dog to the action of its spring 113, thereby drawing said dog back into locking engagement with the escapement wheel. During the moment while the dog is out of engagement with said wheel the latter will be turned a step under the poise motor torque.

The rocking of the escapement motor armature 157 also causes its pin 179 to rock in a contra-clockwise direction (Fig. 3) with initial lost motion until it engages one of the fingers of the bifurcated end of the switch arm 175. On the occurrence of this event it will rock said switch arm out of engagement with the fixed contacts 173, 177 and thereby break the circuit to the escapement motor. When the motor is thus deënergized its armature 157 will be rocked by its spring 161 in a clockwise direction, thereby causing the pin 179 to move with lost motion to one of the members of the bifurcated end of the switch arm 175. Continued rocking in this direction will cause said arm again to connect the fixed contacts 173 and 177 and again complete the circuit to the escapement motor. On the occurrence of this event the motor, again energized, will draw the dog 109 out from engagement with the escapement wheel. The series of operations just described will be automatically, rapidly repeated and the escapement wheel and poise screw shaft will receive a rapid step-by-step feed. This continues until the poise approaches to within a short distance from the balance point. It is important that the last steps of travel of the poise toward the balance point should be at a slow rate of speed to prevent over-travel beyond the balance point.

We will now describe means for changing from rapid steps or beats to slow steps or beats.

The rapid beats of the poise just described have been controlled by the escapement motor. In effecting the final slow beats the escapement motor is under the control of the timer motor G, referred to. This timer motor (Figs. 3, 24, 25 and 26) comprises coils 181 having coöperating therewith an armature 183 adapted to be rocked in one direction on the energization of said coils, and in the opposite direction by a spring 185 on the deënergization of said coils.

The current for energizing the coils of the timer motor is derived through the main supply circuit including the beam needle contact 103. The circuit to the timer comprises a needle contact 187 depending from the beam and coöperating with a mercury cup 189 connected by a wire $e$ with branch wires, one of which $e'$ is connected to a fixed contact 191 at the timer motor, said contact being adapted to be connected by a switch arm 193 controlled by the armature of said motor with a fixed contact 195, the latter being connected by a wire $e^2$ with one of the coils of said timer motor. This coil is connected to the other coil by a wire $e^3$ and the latter coil is connected by a wire $n^7$ with the negative line N. Another branch wire $e^4$ is led from the wire $e$ to a fixed contact 197 at the timer motor adapted to be connected by a switch arm 199 controlled by said motor with a fixed contact 201. This fixed contact is connected by a wire $e^5$ with the wire $d^2$ leading to the coils of the escapement motor.

The switch arm 193 controlled by the timer is shown diagrammatically in Fig. 3 as having a forked end similar to that of the arm 175 of the escapement motor coöperating with a pin 203 on the armature of the timer swinging with lost motion in said forked end. As a result each time the coils of the timer motor are energized its armature rocks the pin 203 with lost motion until it breaks the circuit to the coil by swinging the switch 193 out of engagement with the fixed contacts 191 and 195. As soon as the coils are deënergized the armature spring 185 retracts the armature and swings the switch 193 back into position to connect the fixed contacts 191 and 195. Thus there is a continuous beating action of the timer motor. The switch arm 193, as described, controls the beats of the timer motor. The other switch arm 199, rocked by the armature of the timer, controls the circuit through the wire $e^5$ to the escapement motor. Swinging of the armature of the timer motor therefore continuously makes and breaks this circuit to the escapement motor when the timer motor is energized by the circuit just described. It is desirable to prevent beats of the timer motor during the rapid beats of the escapement motor in order to avoid any interference with the latter. To accomplish this the timer motor is continuously energized during the rapid beats of the escapement motor by a circuit comprising a wire $e^6$ (Fig. 3) tapped off from the wire $d'$ of the escapement motor circuit and connected to a fixed contact 202 at the handle controlled switch T. This fixed contact is adapted to be connected to a fixed contact $202^a$ by a bridge contact $202^b$ on said switch T. The fixed contact $202^a$ is connected by a wire $e^7$ with the wire $e^2$, referred to, leading to the timer motor coils. As a result when the escapement motor is energized for rapid beats by the $d$, $d'$ $d^2$ circuit, the timer motor is continuously energized by the $e^6$, $e^7$ circuit and the switches controlled by the timer motor are stationary.

As the poise under the rapid beat in-feed approaches its position of final balance the beam slowly commences to rise. This causes the needle contact 163 to leave the needle cup contact 165, thereby breaking said circuit $d$, $d'$, $d^2$ to the escapement motor. The needle contact 187 in the $e$, $e'$, $e^2$ circuit for the timer, however, remains in its mercury cup contact. As a result the escapement motor coils are now energized through the $e$, $e'$, $e^2$ or timer circuit.

The beating of the armature of the timer motor is slower than the beating action of the armature of the escapement motor. To accomplish this the timer armature spring 185 is not permitted to retract the same sharply on the deënergization of its coils, but this movement is retarded by a fan 205 and a train of gears between the same and the armature shaft comprising (Figs. 24, 25 and 26) a ratchet 207 fast on the armature shaft and coöperating with spring pressed pawls 209 on a face of a large gear 211 loose on said shaft and meshing with a long pinion 213 journaled on a stud 217. Secured to this pinion is a large gear 219 meshing with a pinion 221 loose on the armature shaft and secured to a large gear 223 meshing with a pinion 225 on the shaft carrying the fan 205. By this arrangement of gearing the armature shaft when rocked by the energization of the timer motor coils will cause the ratchet 207 to wipe past the pawls 209, permitting a quick movement of the armature, but the retreat movement of the armature under the action of its spring 185 will be retarded by the fan through the gearing described.

When the armature is rocked by the energization of the timer coils the switch arm 199 moves to and past the fixed contacts 197 and 201. As a result on the deënergization of said coils the arm approaches said fixed contacts from the side opposite to that in which said arm 199 is shown in Fig. 3. The time required for the arm 199 to approach and reach the fixed contacts 197 and 201 may vary as desired. A second interval of time is found to be very satisfactory. Each time that the switch arm 199 beats back to connect the fixed contacts 197, 201 the circuit including the line $e^5$ will be completed to the escapement motor, thereby energizing the latter and causing the dog 109 (Figs. 32 and 36) to be retracted and permit the escapement wheel and poise shaft to be turned a step under the poise motor torque. This slow beating movement of the poise motor will continue until the poise reaches the balance point. On the occurrence of this event the beam will tilt on up and lift the beam needle contact 187 from its contact cup, thereby breaking the circuit to the timer and causing the arrest of the poise at the beam balance point. The needle contacts 103 and 105, however, at this time, remain in their cups.

As stated, it is highly desirable to operate the poise so as to bring the beam to a position of balance in the shortest time possible. The poise in its outward travel is fed at a high speed by its continuously rotating motor. The change of direction of travel is caused by the tilting of the beam downward. The inertia of the beam, however, delays a down tilt of the beam and the completing of the circuits for reversing the poise to cause the same to travel inward until after the poise under its high continuous speed drive has passed a considerable distance beyond the beam balance point. To reduce this excess over-travel of the poise and thereby economize time the beam influencing device $p$, referred to, is provided and comprises a weight 224 (Figs. 3 and 41) which is placed on the beam during the outward travel of the poise to cause the beam to tilt down prematurely and is removed from the beam on the in-travel of the poise to prevent its influencing the rising of the beam at the true balance point.

To automatically place said weight on the beam and remove the same at the times stated it is mounted on a lever $224^a$ (Fig. 41) fulcrumed intermediate its ends on a fixed bracket $224^b$ appropriately supported within the scale casing, said lever having at one end a roller $224^c$ adapted to rest on the end of the beam. The opposite end of said lever is connected by a rod $224^d$ with an arm $224^e$ movable with an armature $224^f$ of a motor $224^g$. The connecting rod $224^d$ passes loosely through a block $224^h$ swiveled on the lever $224^a$, said rod having an end bent over as at $224^i$ so that when the motor is energized the rod $224^d$ will be drawn down and rock the lever $224^a$ with it and lift the weight up off from the beam. The armature is rocked in an opposite direction by a spring $224^k$. When the motor is deënergized said spring shifts the rod $224^d$ upward, causing the same to slide through the block $224^h$ and permit the lever $224^a$ to be rocked by the weight 224 independently of said rod down onto the beam.

Preferably the weight 224 is not fixed to the lever $224^a$ but is adapted to be adjusted along the same to permit the poise to have more or less over-travel as desired. The weight, however, when once adjusted, has a constant effect on the beam.

The circuit for the weight controlling motor comprises a wire $x$ (Fig. 3) tapped from the wire $a^{13}$ of the reverse motor circuit, said wire receiving its supply of current from the wire $c^2$ connected to the needle cup contact 107 coöperating with the needle contact 105 on the beam. The wire $x$ leads to and is connected to a fixed contact 227 adjacent the influencing weight motor, said fixed contact being adapted to be connected to a fixed contact $227^a$ by a bridge contact $227^b$ on an arm connected to and controlled by the motor armature $224^f$. The fixed contact $227^a$ is connected by a wire $x'$ with one of the coils of the weight controlling motor, said coil being connected by a wire $x^2$ with the other coil of said motor, the latter coil being connected by a wire $x^3$ with the wire $n^{11}$ leading to the main negative line N. The armature spring $224^k$ normally rocks the armature in a direction to shift the bridge contact $227^b$ out of engagement with the fixed contacts 227, $227^a$, thereby breaking the $x$, $x'$ circuit to the motor coils. To energize said motor to shift the bridge contact $227^b$ from its position shown in Fig. 3 to connect the fixed contacts 227, $227^a$ and complete the circuit just described to the motor, a circuit is provided comprising a wire $y$ tapped from the wire $d$ leading to the escapement motor and obtaining its supply of current through the beam needle 163 and needle cup contact 165. The wire $y$ leads to and is connected to a fixed contact $227^c$ at the weight controlling motor, said fixed contact being adapted to be connected by the bridge contact $227^b$, referred to, to a fixed contact $227^d$, the latter in turn being connected by a wire $y'$ with the wire $x'$ leading to the weight controlling motor coils.

On the initiation of a cycle of weighing operations the poise first starts to travel inward and the beam tilts upward. When the beam is in this position the circuits $x$, $x'$ and $y$, $y'$ to the weight controlling motor are both broken by the needle contacts 105 and 163 which are then out of their cups. As a result the weight controlling motor is not energized and its armature is controlled by its spring $224^k$, which maintains the rod $224^d$ upward and permits the weight 224 to rest on and influence the beam. When the poise has reversed and traveled outward sufficiently to cause the beam to tilt downward first the needle 105 will connect with its cup and complete the $x$, $x'$ or holding circuit to the motor with the exception of the break at the fixed contacts 227, $227^a$ at said motor. When the beam tilts on downward, the needle contact 163 will connect with its cup and complete the circuit $y$, $y'$. Since the spring holds bridge contact $227^b$ in position to connect the fixed contacts $227^c$, $227^d$ of the $y$, $y'$ circuit the motor is energized and the bridge contact $227^b$ is shifted by the armature of said motor to connect the fixed contacts 227, $227^a$ of the $x$, $x'$ circuit. This maintains the weight controlling motor in an energized condition. In the course of the rocking movement of the bridge contact 227$^b$ to complete the $x$, $x'$ circuit the rod 224$^d$ is drawn downward, thereby tilting the lever 224$^a$ and lifting the weight 224 up from the beam. The weight is lifted from the beam when the poise is reversed from outward to inward feed. With the weight off of the beam the latter is now free to assume its true position of balance as the poise reaches the balance point entirely uninfluenced by said weight. The effect of the weight was simply to cause a premature reversing of the feed of the poise to prevent loss of time from undue over-travel of the poise.

The poise is permitted to remain at the balance point for a sufficient time to make certain that it has reached its position of final balance. To automatically lock the beam after reaching this position at the expiration of an appropriate interval, such for example as three seconds, there is provided a motor 228 (Fig. 3) having an armature and connections to the beam lock for tripping the latter substantially similar to those disclosed in our said copending applications. The energizing of this motor to cause the same to effect the locking of the beam is controlled by the timer motor. To this end there is provided a circuit comprising a wire $f$ tapped off of the positive line $a'$ and connected to a fixed contact 229 at the timer motor adapted to be connected by the switch arm 199, referred to, with a fixed contact 231, the latter being connected by a wire $f^2$ with one of the coils of the beam lock controlling motor 228. This coil is connected by a wire $f^3$ with the opposite coil of said motor, the latter coil being connected by a wire $n^8$ with the main negative line N.

After the timer switch arm 199 has effected the last second beat of the poise it will swing on past the fixed contacts 197, 201 and being retarded by its fan will slowly approach the fixed contacts 229 and 231. At the expiration of an interval, such for example as three seconds, the switch arm 199 will reach and connect said fixed contacts, thereby completing the circuit to the beam lock controlling motor 228. This will energize the latter and cause the beam lock to lock the beam.

The energizing of the beam lock controlling motor 228 also unlocks the main operating handle Q by its armature, an arm 232$^a$ and connections substantially the same as those disclosed in our said copending applications.

The movement of the beam lock in locking the beam rocks the switch arms 37 and 49, closing the circuits to the lamp and gong, lighting the former and sounding the latter to announce the completion of a weighing operation. This movement of the switch arm 49 also breaks the $c$, $c'$ circuit supplying current to the beam controlled circuits.

To automatically break the starting circuit on the completion of the locking of the beam there is provided a motor 233 (Fig. 3) having an armature 235 drawn in one direction on the energization of the motor and in the opposite direction by a spring 237 on the deënergization of said motor. This armature is provided with an arm 239 adapted to engage a trip finger 241 projecting from the dog 69 which coöperates with the disk pin 71 of the controlling device for the switch 77 in the starting circuit.

To automatically energize the trip motor 233 on the locking of the beam a wire $h$ is tapped off of the wire $a^{12}$ in the circuit to the reverse motor and is connected to a fixed contact 243 adapted to be connected by a bridge contact 245 of the handle actuated switch arm T with a fixed contact 247, the latter being connected by a wire $h'$ with one of the coils of said trip motor. This coil is connected by a wire $h^2$ with the opposite coil of said motor, the latter in turn being connected by the wire $n^9$ with the wire $n^8$, referred to, leading to the main negative line N.

When the beam lock controlled switch 37 is moved to connect the fixed contacts 35 and 39 on the locking of the beam, the circuit will be completed to the trip motor 233, thereby energizing the latter and causing its armature operated arm 239 to strike the finger 241 and trip the dog 69 from the path of the disk pin 71. This will release the disk 73 to the action of its spring 75, which rotates the disk in a clockwise direction and causes the switch arm 77 to be moved out of engagement with the fixed contacts 79 and 81 and thereby breaks the starting circuit. This will deënergize the escapement latch magnet 91 and release the latch 93 to the action of its spring, which will pull said latch into locking engagement with the escapement wheel 95.

The same motor which actuates the poise is used to drive the indicator J. When the poise is fed outward along the beam by a continuous rotation of the motor the indicator is actuated to register the weight corresponding to the outward travel. When the beam is fed rapidly step-by-step inward on the beam by the motor and escapement described the indicator is rotated backward to register the weight corresponding to the position of the poise and when the poise is fed by the motor and escapement under control of the timer with slow final beats toward the balance point the indicator is similarly actuated to register the position of the poise.

To record or print the reading of the register a recording device N is provided similar to that described in our said copending application, Serial No. 540,937. This recorder is driven by any suitable connections from the indicator in synchronism with the indicator.

After the handle Q is unlocked, as described, on the completion of a weighing operation it is rocked back to the right (Fig. 3) and in so doing actuates the platen of the recorder, producing a record of the weight. It also opens the switch T; opens the shutter K revealing the indicator reading; moves the beam locating device I into active position; and throws open the clutch O in the poise screw driving shaft and locks said shaft against rotation. The handle locking device 1 may now be unlocked and moved to separate the bridge contact 5 from the fixed contacts 7 and 9 and break the circuit to the main positive line to the machine.

To prevent the operation of the escapement motor during the initial in-travel of the poise at the commencement of a weighing operation the circuit $d$, $d'$, $d^2$ to the coils of the escapement motor is broken at such time. To accomplish this the switch 169 in said circuit is connected by a link 249 (Fig. 3) with the escapement dog latch lever 127, referred to, (Figs. 32 to 36). The spring 172 in tending to open said switch also tends to rock said latch lever 127 down into engagement with the escapement dog 109.

When the latch 133 is tripped from the latch lever 127 by the operating handle Q in initiating a weighing operation, the latch lever 127 rocks to lock the escapement dog 109 away from the escapement wheel 95. In so doing, through the link 249 the switch 169 is rocked to break the circuit $d$, $d'$, $d^2$ of the escapement motor. The escapement motor is therefore inoperative at such time and does not interfere with the continuous rotation of the screw shaft in effecting the initial infeeding of the poise. When the beam tilts upward the reverse switch E is de-energized and its armature is rocked by its spring, and in so doing through the link 143 moves the latch 133 up to its dotted position shown in Fig. 32. When the poise has traveled outward sufficiently to cause the beam to tilt downward the reverse motor E is energized again, thereby pulling the latch 133 down to its position shown in full lines in Fig. 35. In the course of this movement it rocks the latch lever 127 to trip the escapement dog 109 and in so doing said lever closes the switch 169 in the escapement motor circuit.

In some instances the platform may receive a blow or a force which would exert a pressure thereon in excess of the weight on the platform. This would cause the beam to rise at an improper time and break the circuits, thereby bringing the machine in such a condition that a prolonged inward step-by-step travel of the poise would occur. This would involve a considerable loss of time. To prevent any possibility of this occurrence a device is provided for automatically arresting the step feed providing the total number of steps is in excess of normal. To this end the escapement dog latch lever 127, referred to, (Figs. 32 to 36) is provided with a depending arm 250 carrying a disk 250$^a$ adapted to frictionally engage a smaller wheel 250$^b$ rotatable with the escapement wheel 95, referred to. The disk 250$^a$ is urged to a predetermined rotative position by a spring 250$^c$ having one end connected to a pin 250$^d$ on said disk and its opposite end connected to said arm 250. When the latch lever 127 is rocked to its position shown in Fig. 35 up out of engagement with the escapement locking dog 109, the disk 250$^a$ is in frictional engagement with the wheel 250$^b$. The disk 250$^a$ is provided with a pin 250$^e$ adapted to engage the latch 133 and trip the latter in case the disk 250$^a$ is rotated in a clockwise direction (Fig. 35) through a sufficient arc. This arc is of a length proportionate to the normal length of step travel of the poise so that the latch will be tripped automatically in case the poise exceeds this amount of travel. The tripping of the latch 133 permits the latch lever 127 to rock down to its position shown in Fig. 32 and lock the dog 109 out of engagement with the escapement wheel 95. This prevents any further step feed and releases the escapement wheel to the torque of the motor so that the rest of the inward travel of the poise is by a rapid continuous feed without undue loss of time.

It is sometimes desirable to adjust the indicator relatively to the poise. For example, the accumulation of dirt on the scale platform may make the effect of the same heavier than normal or the cutting of the platform by the frequent running of heavy trucks thereon may make the platform lighter than normal. This may necessitate calibration. Also sometimes it is desirable to set the indicator back of the poise an amount corresponding to the weight of the truck in order that the indicator may register net weights.

To permit these adjustments of the indicator an adjuster mechanism is provided including a locking device controlled by an adjuster key and other devices substantially similar to those disclosed in our said co-pending application Serial No. 540,937. There are, however, some differences due to the change of motor circuits and other parts in the present type of machine from that disclosed in said application.

The adjuster mechanism comprises a key controlled unlocking device including a disk 251 (Fig. 3) having three radial slots 253, 255 and 257 therein. When it is desired to calibrate the scales, first a usual weighing operation is completed with no load on the scale. If the indicator does not register zero it shows that the scale requires calibration. Then the adjuster key is presented to the disk 251 and the latter is turned in a clockwise direction, bringing its slot 255 in registration with a pin 259 on the lever 37 which rocks with the handle Q. This permits the handle to be rocked to the left to initiate a weighing operation. The disk 251 has a dog and ratchet arrangement, as fully disclosed in our said copending application Serial No. 540,937 which prevents the disk from turning in a contra-clockwise direction. As a result, after an adjuster operation has been once initiated the disk 251 must be turned on in a clockwise direction until the series of adjuster operations is completed.

On the completion of the weighing operation initiated by rocking the handle actuated pin 259 into the disk slot 255 the handle Q is rocked to the right to print the indicator registration, thereby freeing the pin 259 from the slot 255. Since the adjuster key cannot be removed until the adjuster cycle of operations is complete and the disk 251 cannot turn in a contra-clockwise direction, the disk must be turned on in a clockwise direction to bring its slot 257 opposite the pin 259. On the occurrence of this event a pin 263 on the disk is introduced between the opposed ends of fingers 265 and 267 mounted on a T lever 269 fulcrumed on a pin 271 and having the switch arm 43, referred to, projecting therefrom. When the pin 263 is between the fingers 265, 267, the disk is susceptible of a slight movement sufficient to permit slight shifting of the disk arm 43 to connect or disconnect the fixed contacts 41 and 45 in the reverse motor circuit including lines $a^{12}$ and $a^{13}$ and thereby make or break said circuit to energize or deënergize the reverse motor and control the direction of torque of the poise motor.

The switch arm 43 may be actuated by the adjuster key to cause said arm to connect the fixed contacts 85, 87 with one another or to connect the fixed contacts 83, 89 with one another. These two sets of contacts have been described as located in the starting circuit which energizes the magnet 91 and withdraws the latch 93 from the escapement wheel 95. Consequently if the arm 43 is moved to connect the contacts 85, 87 said latch will be withdrawn or if said arm 43 is moved to connect the contacts 83, 89 said latch will be withdrawn. This insures the withdrawal of the latch in rotating the motor driving shaft in either direction.

Before the disk pin 263 could be moved to a position between the fingers 265, 267 for rocking the T arm 269 to shift the switch arm 43 as described, it was necessary to rock the operating handle Q to the right to its position shown in Fig. 3, in order to cause the pin 259 to escape from the slot 255. When the handle Q is in this position the clutch O disconnects the poise screw shaft from the poise driving motor and the switch T is open to break the circuit employed in a usual weighing operation.

If it is desired to cause the indicator to move in a direction corresponding to the outward travel of the poise independently of said poise the adjuster key is manipulated to cause the arm 43 to move out of its position shown in Fig. 3 in which it bridges the contacts 41, 45 of the reverse motor circuit and into engagement with the contacts 85, 87 of the starting circuit. This will deënergize the coils of the reverse motor E and thereby place on the poise driving motor a torque which will be effective to feed the indicator outward. The connecting of the contacts 85, 87 by the arm 43 withdraws the latch 93 from the escapement wheel and permits the latter to be rotated by the poise motor and move the indicator outward. When the indicator has been moved outward to the extent desired the switch arm 43 is rocked back to its position shown in Fig. 3, thereby deënergizing the magnet 91 and permitting the switch 93 to lock the ratchet wheel.

If it is desired to move the indicator in a direction corresponding to the inward travel of the poise, but independently of said poise, the switch arm 43 is rocked to connect the fixed contacts 41 and 45, thereby completing a circuit to the reverse motor E, energizing its coils and causing a torque to be placed on the poise motor for moving the indicator inward.

The arm 43 is rocked sufficiently to connect the fixed contacts 83 and 89, thereby again completing the circuit to the latch magnet 91, causing its latch 93 to release the escapement wheel. The feed of the indicator inward is controlled by the escapement motor. It is therefore necessary to energize this motor. To this end a fixed contact 273 is provided adjacent the fixed contacts 83, 89 at the adjuster mechanism. The fixed contact 273 is connected by a wire $i$ with the wire $e^6$ leading to the coils of the escapement motor through the wire $d'$. When the adjuster control arm is moved to connect the fixed contacts 83, 89 it also connects said contacts with the contact 273. It will be recalled that the fixed contact 89 is connected by wire $b$ with wire $a$, which is connected in turn to the main positive line. As a result, when the switch 43 is moved as just described, it will supply current to the coils of the escapement motor and cause a beating action of said motor such as has been already described. The indicator will continue to move inward until the adjuster control switch arm 43 is moved back to its mid position shown in Fig. 3, thereby breaking the circuit to the escapement motor, deënergizing the latter and arresting the indicator.

Before the disk 251 can be rotated sufficiently to permit the escape of its key the slot 253 must be rotated back in line with the pin 259, as shown in Fig. 3. The disk, however, cannot rotate until its pin 263 has been released from between the adjacent ends of the fingers 265 of the T lever. To release the pin the handle operated lever 57 is provided with a pin 275 adapted to engage the finger 267 when the handle is rocked to the left. This will permit a slight adjustment of the disk 251 sufficient to move the pin 263 past the end of the finger 267. In swinging the handle Q to the left to release the disk pin 263 a usual weighing operation was initiated. On the completion of this operation the handle Q is rocked again to the right, causing its pin 259 to escape from the slot 255 and permitting the disk 251 to be rotated to present the slot 253 in line with the pin 259. When the disk is in this position the adjuster key can be removed.

By the above description it will be apparent that an adjuster operation having been once initiated it was necessary to make a preliminary weighing operation and a final weighing operation. An intermediate indicator adjusting operation is made if desired. All of these operations must be completed before the adjuster key can be removed. The indicator reading of the two complete weighing operations is automatically printed with a mark showing that they are adjuster operations in a manner similar to that disclosed in our copending application Serial No. 540,937.

As stated, the poise motor has a constant driving torque. This torque is free to feed the poise continuously through a substantial part of its travel, but is checked by the escapement mechanism to produce a step-by-step feed of the poise during a portion of its travel. To prevent undue shock on the armature of the motor as its torque is checked intermittently by the escapement mechanism there is interposed between the poise motor and said escapement mechanism a friction clutch 277. Any appropriate clutch may be employed, such for example as shown in Fig. 40, wherein 279 designates the motor driving shaft having an end projecting into a sleeve 281 and connected thereto by a pin 283 entered through a bar 285 secured in slots in said sleeve and in said shaft. Fast on one end of this sleeve is a disk-like head 287 and also on said sleeve is a ring 289 having a pin 290 for causing said ring to rotate with said sleeve while permitting the same to slide more or less axially of said sleeve. Said ring 289 is pressed toward said head by a helical spring 291 encircling said sleeve and confined between said ring and set nuts 293. Interposed between the head 287 and ring 289 is a friction ring 295 projecting outward beyond said head and ring and carried by studs 297 projecting from a disk 299 having a boss 301 fast on the driving shaft 303. This shaft projects through the disk 299 beyond the same and into the sleeve 281.

By the above described construction the spring 291 will cause the head 287 and ring 289 to frictionally grip the ring 295 and transmit rotation from the motor shaft 279 and its sleeve 281 to the driving shaft 303. Obviously in the event that there is undue resistance to the rotation of the shaft 303 the ring 295 will slip relatively to the head 287 and ring 289. This will prevent injury to the motor as checked by the escapement mechanism described and will also prevent injury to any other parts driven by said motor in the event of abnormal conditions.

Having described the friction clutch in the transmission from the poise motor to the poise, we will next describe the connections from said friction clutch to the escapement wheel 95, referring more particularly to Figs. 2, 3, 37, 38 and 39. These connections include a bevel gear 305 fast on said poise motor driving shaft 303 meshing with a bevel gear 307 fast on a shaft 309 journaled in appropriate bearings (Fig. 2) supported within the scale casing. Fast on the shaft 309 is a bevel gear 311 meshing with a bevel gear 313 fast on a shaft 315 on which is mounted the escapement wheel 95. The shaft 315 is journaled in a bearing 323 on a standard 325 appropriately mounted within the scale casing. This shaft projects through said bearing and has an enlarged head recessed to receive a cup 329 forming a bearing for one end of a shaft 331, the opposite end of which is journaled in a bearing 333 on the standard 335 also appropriately mounted within the scale casing. The shaft 331 projects somewhat beyond the standard 335 for connection with transmission devices from said shaft to the screw shaft for feeding the poise along the beam.

The poise motor through the connections described will transmit its rotative movement to the shaft 315 and the bevel gear 313.

Next the clutch mechanism O will be described for causing the shaft 331 to rotate with the driving shaft 315 at the times desired. This clutch mechanism comprises a pin 347 projecting from the bevel gear 313 and adapted to enter into any space between teeth of a clutch wheel 349 loosely mounted on the shaft 331. The teeth of this wheel preferably are beveled to facilitate the entrance of the pin 347 therebetween. The clutch wheel is adapted to be slid axially of the shaft 331 to cause the same to engage with or disengage from the pin 347. To this end said wheel is provided with a hub 351 grooved to receive a fork 353 fast on a slide rod 355 mounted in bearings 357 in the standards 325 and 335. This fork is connected by a link 359 with the operating handle Q. By this means the fork may be readily slid axially of the shaft 331 to throw the clutch wheel 349 into and out of engagement with the pin 347 as desired.

To transmit rotation from the clutch wheel 349 to the shaft 331 with as little play or lost motion as possible the hub 351 is provided with a fork arm 361 of substantial length for receiving a wrist pin 363 on an arm 365 fast on the shaft 331. The arm 361 is free to slide relatively to said wrist pin as the clutch wheel is adjusted axially of the shaft 331. By this construction any slight lost motion between the wrist pin 363 and the fork arm will have far less effect than the same amount of lost motion in a spline directly connecting said boss to said shaft.

When the clutch is thrown to prevent the transmission of rotation from the driving shaft 303 to the shaft 331 it is desired that the latter shaft should be locked against rotation to prevent any movement of the poise screw shaft other than that had by the driving of the same from the driving shaft 303. To this end a lock tooth 367 is provided on a bracket 369 secured to a support 371. It will be apparent that when the clutch wheel 349 is slid out of engagement with the pin 347 it will be brought into engagement with the lock tooth 367 and thereby will prevent rotation of the clutch wheel and the shaft 331.

The indicator is driven by the poise motor through the shaft 309, referred to, said shaft being extended beyond the bevel gear 307 to receive a bevel gear 366 fast thereon meshing with a bevel gear 366$^a$ fast on a shaft 366$^b$ connected to the indicator J (Fig. 1).

It will be observed that the poise motor, its friction clutch and the clutch for connecting the poise screw shaft with the driving shaft, are all mounted in fixed positions off of the beam. An important feature of the invention relates to the provision of universal driving connections from the shaft 331 to the poise screw shaft on the beam so that the latter may receive rotation to feed the poise without influencing or affecting the free tilting of the beam. Preferably two universal joints are interposed between the shaft 331 and the poise screw shaft. A description of one will suffice for both. Referring more particularly to Figs. 4 to 14 inclusive, there is shown a universal joint comprising a pair of yoke plates 373 spaced by a block 375 and secured thereto by appropriate screws. This block has a central bore for receiving an end of the shaft 331 projecting beyond the bearing 333 and is secured to said shaft by a set screw 377. These yoke plates carry cone bearings 379 (Fig. 8) having smooth shanks 381 for insertion in opposed holes in said plates. The points of said cone bearings are set in conical seats 383 (Fig. 13) in one arm of a Greek cross 385. The cone bearings of each pair are slightly offset so that the points of said cone seats are in the same straight line. A similar yoke device 387 is provided for the other arm of the Greek cross and is connected thereto by similar cone bearings 388 and seats 388$^a$. The universal joint thus constructed constitutes a highly desirable device having a minimum amount of friction.

The block of the yoke device 387 is bored to receive with a sliding fit an end of a shaft 389 (Fig. 37). To transmit rotation to said shaft with minimum play or lost motion the block of the yoke device 387 is provided with an arm 391 projecting radially a substantial distance from the shaft 389 and its free end is forked to receive a wrist pin 393 on an arm 395 fast on the shaft 389.

The shaft 389 projects toward and is connected to the poise screw shaft C by a universal joint 397 similar to the joint just described. Preferably the center line of the universal joint 397 is in exact alinement with the knife edge fulcra 399 of the beam, as well shown in Figs. 4, 5 and 6, a detail of the knife edge being shown in Fig. 7.

The needle contacts referred to for the beam are shown in detail in Figs. 27, 28 and 29. They are carried by a block 401 of insulation material slotted to straddle the end of the beam A and secured thereto by a screw 403. The main supply of current through the beam is through the main needle contact 103. This contact is connected by a conducting plate 405 with the needle contacts 105, 187 and 163.

To steady the beam in its tilting movements the needle contact 103 is shown herein in the form of a cylinder having air vents 407 adjacent the upper end thereof and having a mercury port 409 in the bottom of the cylinder. The restriction to the flow of air and mercury had by said vents and port effectively steadies the beam.

It will be observed that the cup contact 165 is somewhat lower than the others. This cup contact is in the circuit $d$, $d'$, $d^2$ to the escapement motor. As stated, it is desired that the needle contact 163 should leave said cup to break the circuit to said motor on the initial rise of the beam in order to reduce the frequency of the final beats of the poise. The contact 187 leaves its cup on the final rise of the beam when it reaches balance point and thereby breaks the circuit to the timer motor and arrests the poise.

The indicator J is disclosed more in detail in Figs. 30 and 31, and comprises a series of register wheels 411 mounted on a shaft 413 journaled in bearings in standards 414 appropriately mounted within the scale casing, said register wheels being driven in accordance with the poise movements by the poise motor through the gears 366 and 366ᵃ and shaft 366ᵇ referred to. The shaft 366ᵇ is extended to the indicator J and has fast thereon a gear 415 meshing with an intermediate gear, the latter in turn meshing with and driving a gear 419 fast on the indicator shaft 413. The units wheel 411 of the indicator also is fast on said shaft. Since the poise is fed at a very high rate of speed the indicator which is moved in unison with the poise also is driven at a very high rate of speed. On each complete rotation of the units wheel of the indicator the tens wheel is rotated $\frac{1}{10}$ of a rotation. We will now describe a transfer device for imparting a tenth of a rotation from the units wheel to the tens wheel on each complete rotation of the former. This device comprises a double toothed arm 421 fast on the units wheel and adapted to engage a pinion 423 loose on a shaft 425 journaled in the supports 414. To prevent this pinion from rotating excepting at the times when it is engaged by said double toothed arm the pinion is provided with a star wheel extension 426 having portions peripherally curved to conform to the contour of a disk 427 fast on the face of the units wheel. The periphery of this disk is smooth and uninterrupted excepting opposite to the double toothed arm. As a result the pinion is held stationary by said disk excepting at the times when it is engaged by said toothed arm. The speed of rotation of the units wheel, however, is so high that the intervals when the pinion is not engaged by said arm are so short that the pinion is almost continuously rotated. If the tens wheel were advanced positively from the units wheel driven pinion the transfer mechanism would be quickly worn out by the frequency of the beats of the toothed arm on the pinion. To avoid this the transfer is provided with a yielding transmission comprising a second pinion 429 loosely journaled on a shaft 431 journaled in turn in the bearing brackets 414 and driven by the pinion 423. The pinion 429 has a hub 434 projecting from one face thereof provided with cam teeth 435 and notches 437 engaging similar notches and teeth respectively, on a hub 439 projecting from one of the faces of a wide faced pinion 441 loose on said shaft 431. This wide faced pinion meshes with a pinion 443 loose on said shaft 425 meshing in turn with a gear 445 fast on the tens wheel 411. The wide faced pinion is free to slide axially on its shaft but is urged to the left of Fig. 30 to maintain engagement of the hub teeth by a helical spring 447 on the shaft 431 confined between said wide faced pinion and a nut 449 threaded on said shaft, said nut being held by a suitable lock nut 451. To prevent the pinion 429 from sliding against the end of the bearing bracket 414 there is provided a short sleeve 453 fast on said shaft. To limit the sliding movement of the wide faced pinion to the right of Fig. 30 the shaft 431 is provided with a collar 455 adapted to be engaged by the hub of said wide faced pinion.

The operation in transmitting a tenth of a rotation to the tens wheel on each complete rotation of the units wheel is as follows. Each time the latter rotates its toothed arm engages the pinion 423 and turns the same $\frac{1}{5}$ of a rotation. This movement is transmitted through the wide faced pinion and the pinion 443 to the gear attached to the tens wheel 411 and thereby imparts $\frac{1}{10}$ of a rotation to the latter. In imparting the quick successive turning movements from the pinion 429 to the wide faced pinion, the latter lags somewhat and there is a relative rotation between the two pinions due to the relative wiping of the inclined cam faces of the teeth on their coöperating hubs while one of them moves axially from the other under the yielding of the spring 447. When the indicator stops, however, the spring presses the hub teeth of the pinion 441 closely into engagement with the hub teeth of the gear 429 as shown in Fig. 30. In the course of this movement the pinion 441 rotates slightly and catches up or recovers the movement which it lost by virtue of its lag. Consequently the tens wheel will be so related with the units wheel that the numerals to be read on the respective wheels will all be in one line. The wide faced pinion never slides on its shaft sufficiently to permit the coöperating teeth on the opposed hubs to move completely past one another. This is due to the presence of the stop on the shaft. As a result there is never any lost increment of transmission. In practice it is found that the wide faced pinion experiences a rapid reciprocating axial movement in transmitting rotation from the units to the tens wheel.

The transfer is made from the tens wheel to the hundreds wheel by a toothed arm, star wheel, pinion and disk similar to those described. The transfer is similarly made from the hundreds to the thousands wheel. Since the hundreds and thousands wheels are turned infrequently as compared to the tens wheel a yielding transfer mechanism therefor is not essential.

From the above description the operation of the machine will be apparent. In summary, the cycle of operations may be described as follows:

A load is placed on the platform of the scales. Then the unlocking device 1 is rocked to close the switch 5 and connect the machine with an outside source of electricity. This places a torque on the poise motor and lights the indicator lamp. The operating handle Q is then thrown to the left. This throws the clutch O to unlock the poise shaft and connect the same with the poise motor; unlocks the beam lock and releases the beam positioning device; closes the indicator shutter K; throws and locks the escapement dog 109 out of engagement with the escapement wheel 95; closes the switch T and closes the switch 77 in the starting circuit. The closing of this switch completes the starting circuit, thereby energizing the magnet 91 and withdrawing the escapement latch 93 from the escapement wheel. The poise motor rotates in a direction to feed the poise initially inward a short distance. Then the beam rises, thereby breaking the circuit to the reverse motor and causing the poise to travel continuously outward on the beam. This travel is at a very high rate of speed, so high in fact that the poise would travel a considerable distance beyond the beam balance point before the beam would tilt downward were it not for the fact that the beam influencing weight causes the beam to tilt down prematurely and thereby prevent excessive over-travel of the poise. When the beam tilts down the reverse motor is again energized, reversing the direction of the current through the poise motor and placing a torque on the latter, causing the poise to feed inward. At the same time the influencing weight motor is energized, thereby lifting the weight from the beam. The energization of the reverse motor incidentally operated to pull down the latch lever 127 and release the escapement dog 109. This movement of the latch lever 127 closes the switch 169 and completes the circuit to the escapement motor. As a result the poise is caused to travel inward with rapid beats. This continues until the poise approaches the balance point when the beam commences to rise, thereby lifting the needle contact 163 from its cup 165 and breaking the circuit to the escapement motor, which is then actuated with slower or second beats under the control of the timer. A few such slow beats are sufficient to bring the poise to the balance point. On the occurrence of this event the beam tilts upward, lifts the needle contact 187 out of its cup and breaks the circuit to the timer. At the expiration of a three second or other short interval the timer switch, as retarded by the timer fan, will complete the circuit to the beam lock motor, thereby causing said motor to actuate said lock and lock the beam. This motor also trips the dog 59, thereby unlocking the operating handle Q. The locking of the beam lock completes the circuit to the lamp and gong, lighting the former and sounding the latter, announcing the completion of a weighing operation. The handle is then free to be rocked to the right to open the clutch U and disconnect the screw shaft from the motor shaft, at the same time locking the screw shaft to the frame, thereby preventing any inadvertent rotation of said screw shaft during the interval elapsing between the weighing operation just finished and the next operation. The rocking of the handle to the right also opens the shutter K, revealing the indicator reading, opens the switch T, moves the beam locating device into active position, and operates the recording device to make a record corresponding to the indicator reading. This marks the completion of a cycle of weighing operations. The machine is now in readiness to perform the next weighing operation in a manner similar to that just described.

The machine described is remarkably fast in its operation with a capacity of performing a complete weighing cycle in a very few seconds. This is due principally to the rapid continuous outward feeding of the poise by the continuously rotating motor and the very rapid inbeating of the motor followed by a few slow beats as the beam approaches the balance point.

The mechanism described herein is not only capable of performing a complete cycle weighing operation more rapidly than the machines disclosed in our said copending applications but by a simpler appartus. A single motor mechanism is employed for transmitting the drive to the poise, to the indicator and to the recorder and the change in direction of feed is effected by reversing the direction of rotation of this motor.

It will be observed that the driving mechanism for the poise does not in any way encumber the beam but is mounted entirely independently thereof.

In calibrating the scale a weighing operation is completed with no load on the platform. If the indicator registers zero no adjustment will be necessary, but if the indicator presents a reading greater or less than zero the adjuster mechanism will be operated to actuate the indicator independently of the poise to adjust the indicator to read zero. Then a usual weighing operation is completed as a check to this adjustment and at the conclusion of this the indicator again should read zero.

If it is desired to exclude a certain weight from the indicator reading, such for example as the weight of a truck on the platform the truck is weighed empty and then the indicator is adjusted to read zero with the truck on the platform. As a result, succeeding weighing operations will register net weights exclusive of the weight of the truck.

Having described one illustrative embodiment of the invention without limiting the same thereto, what we claim as new and desire to secure by Letters Patent is:

1. In a weighing machine, the combination of a beam; a poise; a screw shaft for said poise; a driving motor mounted off of the beam; transmission connections from said motor to said shaft including a clutch for disconnecting said motor from said shaft; and means for locking said shaft against rotation when disconnected from said motor.

2. In a weighing machine, the combination of a beam; a poise; a motor having a torque for feeding said poise continuously in one direction and means automatically operative adapted to control said motor to feed said poise step-by-step in an opposite direction.

3. In a weighing machine, the combination of a beam; a poise; a driving motor therefor for feeding said poise continuously in one direction during the cycle of a single weighing mechanism; means for reversing said motor; and means coöperating with said motor for changing the feed of the same from a continuous to a step-by-step feed.

4. In a weighing machine, the combination of a beam; a poise; and driving means for said poise, including an escapement mechanism, for effecting a step-by-step feed of said poise.

5. In a weighing machine, the combination of a beam; a poise; and means for feeding said poise along said beam including a motor having a torque tending to rotate the same continuously, an escapement wheel driven by said motor, a dog for checking rotation of said escapement wheel, and means for intermittently releasing said dog from said wheel to permit a step-by-step rotation thereof.

6. In a weighing machine, the combination of a beam; a poise; and means for feeding said poise along said beam including a motor, an escapement wheel driven thereby, a dog for checking movement of said wheel, and motor means for releasing said dog intermittently from said wheel to permit a step-by-step rotation thereof.

7. In a weighing machine, the combination of a beam; a poise; and means for feeding said poise along said beam including a motor, an escapement wheel driven thereby, a dog for said wheel, and a motor having a rocking armature connected to said dog for intermittently releasing the latter from said wheel to permit the latter to advance step-by-step.

8. In a weighing machine, the combination of a beam; a poise; means for feeding said poise along said beam including a motor and an escapement mechanism for effecting a step-by-step feed of said poise, and means operable for preventing at times operation of said escapement mechanism.

9. In a weighing machine, the combination of a beam; a poise; and means for feeding said poise along said beam including a motor, an escapement wheel driven thereby, means for releasing said wheel intermittently and means to lock said wheel against rotation.

10. In a weighing machine, the combination of a beam; a poise; and means for feeding said poise along said beam including a motor, an escapement wheel driven thereby, means for releasing said wheel intermittently, lock means to prevent rotation of said escapement wheel, and means for releasing said lock means from said wheel during the weighing operation.

11. In a weighing machine, the combination of a beam; a poise; and means for feeding said poise along said beam including a motor, an escapement wheel driven thereby, means for releasing said wheel intermittently, a latch for preventing rotation of said wheel, and electro-magnetic means for releasing said latch from said wheel to permit a weighing operation.

12. In a weighing machine, the combination of a beam; a poise; and means for feeding said poise along said beam including a motor, an escapement wheel driven thereby, lock means to prevent rotation of said escapement wheel, means to release said lock means to permit a weighing operation, a dog coöperating with said wheel, and means for intermittently releasing said dog from said wheel to permit a step-by-step rotation of said wheel.

13. In a weighing machine, the combination of a beam; a poise; means for feeding said poise along said beam including a motor, an escapement wheel driven by said motor, locking means for said escapement wheel, means for releasing said escapement wheel to permit a continuous rotation thereof on the initial in-travel of the poise and the out-travel of the poise, and means coöperating with said escapement wheel for producing a step-by-step rotation thereof on the final in-travel of said poise toward the balance point.

14. In a weighing machine, the combination of a beam; a poise; and means for feeding said poise along said beam including a driving motor having a torque tending to rotate the same continuously; means including a controlling motor for providing a step-by-step feed of said poise by said driving motor, an electric circuit for said controlling motor, and means for rendering the latter ineffective during the initial in-travel of the poise on the commencement of a weighing operation.

15. In a weighing machine, the combination of a beam; a poise; a motor for imparting a continuous feeding movement to said poise along said beam; and means coöperating with said motor for imparting a rapid step-by-step feeding movement to said poise and having provision for reducing the speed of said step-by-step feed as said poise approaches the balance point all in a single weighing cycle.

16. In a weighing machine, the combination of a beam; a poise; a motor for imparting a continuous feeding movement to said poise; means coöperating with said motor to impart a step-by-step feeding movement to said poise; and means for reducing the frequency of said steps as the poise approaches the balance point.

17. In a weighing machine, the combination of a beam; a poise; a motor for imparting a continuous feeding movement to said poise along said beam; and means coöperating therewith controlled by said beam for effecting a step-by-step movement followed by a slower step-by-step movement of said poise.

18. In a weighing machine, the combination of a beam; a poise; means for feeding said poise continuously initially; means for feeding said poise step-by-step finally; and means controlled by the initial tilting of the beam toward the balance point for effecting the final steps of the poise at a reduced speed.

19. In a weighing machine, the combination of a beam; a poise; a motor for feeding said poise continuously along said beam; means coöperating with said motor for feeding said poise step-by-step along said beam; and timer means coöperating therewith for reducing the frequency of the final steps of the poise.

20. In a weighing machine, the combination of a beam; a poise; a motor for feeding the poise continuously outward on the beam; means including a step-by-step motor coöperating with said driving motor for feeding said poise inward on the beam, an electric circuit for said step-by-step motor, and timer means for automatically controlling said circuit and producing final steps of the poise at slower intervals.

21. In a weighing machine, the combination of a beam; a poise; a driving motor for feeding said poise along said beam; and means for controlling said motor including an escapement mechanism having a motor for controlling the same and a timer motor for controlling said escapement motor.

22. In a weighing machine, the combination of a beam; a poise; a driving motor for feeding said poise along said beam; an escapement mechanism for controlling said driving motor; a controlling motor for said escapement mechanism; a timer motor for controlling said escapement motor; and electrical connections including circuits for said motors controlled by said beam.

23. In a weighing machine, the combination of a beam; a poise; a driving motor for feeding said poise along said beam; an escapement mechanism; a motor for controlling said escapement mechanism; a circuit for said controlling motor having make and break means actuated by said beam; a timer mechanism for regulating said controlling motor; and a circuit for said timing mechanism including make and break means controlled by said beam.

24. In a weighing machine, the combination of a beam; a poise; driving means for feeding said poise out or in along said beam; means actuated by the tilting of the beam for reversing the poise; and means for causing premature tilting of said beam to prevent undue over-travel of said poise beyond the balance point.

25. In a weighing machine, the combination of a beam; a poise; driving means for feeding said poise out or in along the beam; and reversing means for said driving means including means for temporarily bearing on the beam to influence the tilting thereof.

26. In a weighing machine, the combination of a beam; a poise; driving means for feeding said poise out or in along the beam; and reversing means for said driving means including a weight for temporarily bearing on the beam to influence the tilting thereof.

27. In a weighing machine, the combination of a beam; a poise; driving means for feeding said poise along said beam; means controlled by the tilting of said beam for reversing said driving means and including a weight and means for temporarily placing said weight on said beam to cause a premature downward tilt of said beam.

28. In a weighing machine, the combination of a beam; a poise; means for feeding said poise along said beam; and means controlled by the tilting of said beam for reversing said feeding means including a weight and means for placing said weight on said beam for outward travel of said poise and having provision for removing said weight from said beam on inward travel of the beam toward the balance point.

29. In a weighing machine, the combination of a beam; a poise; a motor for feeding said poise along said beam; and means for automatically reversing said poise on the tilting of said beam downward including a circuit having make and break means controlled by said beam, a motor in said circuit, and pressure means controlled by said motor for increasing the downward tilting tendency of the beam.

30. In a weighing machine, the combination of a beam; a poise; means for feeding said poise along said beam; and means controlled by the tilting of said beam for reversing said feeding means and including devices for causing an abnormal downward tilting of said beam and permitting a normal uptilting of said beam.

31. In a weighing machine, the combination of a beam; a poise thereon; motor means for feeding said poise along said beam; an electric circuit for said motor means; switch means in said circuit; and a reversing motor controlled by movement of said beam for actuating said switch means to reverse said motor.

32. In a weighing machine, the combination of a beam; a poise thereon; motor means for feeding said poise along said beam; an electric circuit for said motor means; switch means in said circuit; a reversing motor for actuating said switch means; a circuit for said reversing motor; and contact means in said circuit controlled by said beam for completing said circuit to energize said reversing motor and change the direction of said poise feeding motor.

33. In a weighing machine, the combination of a beam; a poise; motor means for feeding said poise along said beam; a circuit for said motor means; switch means in said circuit; a reversing motor having an armature for moving said switch means in one direction, a spring coöperating with said armature to move said switch means in an opposite direction, a circuit for said reversing motor having contact means actuated by said beam for making or breaking said circuit to cause said reversing motor armature to change the direction of current through said motor means circuit and reverse said motor means to change the direction of feed of said poise.

34. In a weighing machine, the combination of a beam; a poise thereon; driving motor means for feeding said poise along said beam with a continuous feeding movement; means including motor means coöperating with said driving motor means for imparting a step-by-step feed to said poise; a circuit for said step-by-step motor means; a switch in said circuit; and means for opening said switch to prevent step-by-step feed of said poise on the initiation of a weighing operation.

35. In a weighing machine, the combination of a beam; a poise thereon; motor means for feeding said poise along said beam with a continuous feeding movement; an escapement mechanism coöperating with said motor means for feeding said poise inward with a step-by-step movement and including an escapement wheel, a dog coöperating with said wheel and an operating handle for throwing said dog out of engagement with said escapement wheel to permit the initial feed of said poise to be by a continuous movement.

36. In a weighing machine, the combination of a beam; a poise thereon; motor means for feeding said poise along said beam with a continuous feeding movement; an escapement mechanism coöperating with said motor means for feeding said poise with a step-by-step movement; and means for automatically changing from said continuous to said step-by-step movement.

37. In a weighing machine, the combination of a beam; a poise; motor means for feeding said poise along said beam with a continuous feeding movement; an escapement mechanism for shifting the feed from a continuous to a step-by-step movement; and means coöperating with said escapement mechanism for preventing a step-by-step travel of said poise in excess of normal.

38. In a weighing machine, the combination of a beam; a poise thereon; motor means for feeding said poise along said beam with a continuous feeding movement; an escapement mechanism coöperating with said motor means for effecting a step-by-step movement and including an escapement wheel, a reciprocating dog coöperating with said wheel to permit step-by-step movements thereof under the motor torque; a latch for locking said dog away from said escapement wheel; and means for automatically rendering said latch effective to so lock said dog on step-by-step travel of said poise in excess of normal.

39. In a weighing machine, the combination of a beam; a poise; motor means for feeding said poise along said beam with a continuous feeding movement; an escapement mechanism coöperating with said motor means for effecting a step-by-step movement and including an escapement wheel, a reciprocating dog for permitting step movements of said wheel under the motor torque, a latch member for locking said dog away from said wheel, a latch for holding said member away from said dog, a wheel carried by said latch member adapted to be driven with said escapement wheel and having provision for actuating said latch to render said latch member effective to lock said dog away from said escapement wheel and permit a continuous rotation of the latter.

40. In a weighing machine, the combination of a beam; a poise; motor means; transmission means from said motor means to said poise including a clutch, a handle for shifting said clutch, and means coöperating with said clutch for locking the poise against movement.

41. In a weighing machine, the combination of a beam; a poise; a screw shaft upon which said poise is mounted; motor means; connections from said motor means to said shaft for rotating the latter by the former and including a clutch, lock means for said screw shaft and an operating handle for shifting said clutch to disconnect said shaft from said motor means and connect said shaft with said lock means.

42. In a weighing machine, the combination of a beam; a poise; a screw shaft for feeding said poise along said beam; motor means; transmission means from said motor means to said screw shaft including clutch members, one rotative with said motor means and another rotative with said screw shaft, lock means, and means for shifting one of said clutch members from the other and into engagement with said lock means.

43. In a weighing machine, the combination of a fulcrumed beam; a poise thereon; motor means; and transmission means extending from said motor means to said poise including a universal joint on line with the fulcrum of said beam.

44. In a weighing machine, the combination of a support; a beam; knife-edge fulcra between said support and beam; a poise on the latter; driving means; and transmission means from said driving means to said poise including a universal joint in line with said knife-edge fulcra.

45. In a weighing machine, the combination of a support; a beam having knife-edge fulcra connecting the same to said support; a poise; a screw shaft for feeding said poise along said beam; a motor; and connections from said motor to said screw shaft including a universal joint connected to said screw shaft in line with said knife-edge fulcra.

46. In a weighing machine, the combination of a beam; a poise; a motor having a torque tending to feed said poise with a continuous movement; means for effecting a step-by-step movement of said motor; and transmission means from said motor to said step means including a friction clutch.

47. In a weighing machine, the combination of a beam; a poise; a motor for feeding said poise along said beam; an electric circuit for said motor having contacts controlled by said beam, one of said contacts having provision for dash-pot action to check movement of said beam.

48. In a weighing machine, the combination of a beam; a poise; motor means for feeding said poise along said beam; a circuit for said motor means including a fixed mercury cup; a hollow contact carried by said beam coöperating with said cup and having provision for retarding its movement therein to check the tilting of the beam.

49. In a weighing machine, the combination of a beam; a poise; motor means for feeding said poise along said beam; an electric circuit for said motor means having therein a mercury cup contact; a hollow contact on the beam for immersion in said mercury cup contact and having vents permitting a restricted flow of mercury into and out of said member.

50. In a weighing machine, the combination of a beam; a poise thereon; motor means for imparting continuous and step-by-step feed movements to said poise along the beam; and means for automatically shifting from said continuous to said step feed including an electrical circuit and contact means actuated by said beam, a beam lock, and motor means for rendering the same effective to lock the beam after the completion of a weighing operation.

51. In a weighing machine, the combination of a beam; a poise; motor means for feeding said poise along said beam by continuous and step-by-step movements; a beam lock; an actuating motor for the latter; and timer means for rendering said actuating motor effective to cause said beam lock to lock the beam after the completion of a weighing operation.

52. In a weighing machine, the combination of a beam; a poise; means including a motor for feeding said poise along said beam by continuous and step-by-step movements; a beam lock; a motor for actuating said lock; a timer motor for controlling said beam lock motor; electrical circuits for said motors; and contact means in said timer motor circuit controlled by said beam for rendering said timer motor effective to actuate said beam motor to lock the beam.

53. In a weighing machine, the combination of a beam; a poise thereon; a motor for feeding said poise along said beam by continuous and step-by-step movements; a reverse motor; an escapement motor; a timer motor; and circuits for said motors controlled by said beam whereby said poise feeding motor is automatically reversed and arrested by tilting of said beam.

54. In a weighing machine the combination of a beam; a poise; an indicator for registering movements of said poise; and motor means for imparting simultaneous continuous feeding movements to said poise and indicator and controlling means coöperating with said motor means to drive said indicator independently of said poise.

55. In a weighing machine the combination of a beam; a poise; an indicator for registering movements of said poise; means for imparting continuous feeding movements to said poise and indicator; and means for calibrating the machine including indicator adjusting means and controlling means having devices for insuring a normal weighing operation before and after an indicator adjusting operation.

56. In a weighing machine the combination of a beam; a poise; an indicator for registering movements of said poise; motor means for imparting continuous feeding movements to said poise and indicator and having devices for imparting step-by-step movements thereto and calibration means having provision for actuating said indicator independently of said poise.

57. In a weighing machine the combination of a beam; a poise; an indicator for registering movements of said poise; motor means for imparting continuous feeding movements to said poise and indicator in one direction; means coöperating with said motor means for producing step-by-step movements of said indicator and poise in an opposite direction; and controlling means for the same for actuating said indicator independently of said poise.

58. In a weighing machine the combination of a beam; a poise; an indicator for registering movements of said poise; a motor having a torque tending to feed said poise and indicator by a continuous feeding movement; means coöperating with said motor for producing a step-by-step feed of said poise and indicator; means including a clutch for permitting the drive from said motor to said poise; and means for operating said clutch to disconnect said poise from said motor and permit the driving of said indicator independently thereof.

59. In a weighing machine the combination of a beam; a poise; a motor for imparting a continuous feeding movement thereto; means including a circuit controlled by the beam for automatically reversing said motor to change the direction of feed of said poise; means coöperating with said motor for producing a step-by-step feed of said poise including a circuit controlled by said beam for automatically starting and stopping said step-by-step feed.

60. In a weighing machine the combination of a beam; a poise; a motor for imparting a continuous feeding movement to said poise; means including a circuit controlled by said beam for automatically reversing said motor to change the direction of feed of said poise; and means including an electric circuit controlled by said beam for automatically changing the feed from a continuous to a step-by-step movement simultaneously with the reversing of said poise.

61. In a weighing machine the combination of a beam; a poise; a motor for imparting a continuous feeding movement to said poise; means including a circuit controlled by said beam for automatically reversing said motor to change the direction of feed of said poise; means including an electric circuit controlled by said beam for automatically producing a rapid step-by-step feed of said poise; and means including an electric circuit controlled by said beam for automatically producing a slow step-by-step feed of said poise.

62. In a weighing machine the combination of a beam; a poise; a motor for imparting a continuous feeding movement to said poise; an electric circuit for said motor; reverse switch means in said circuit; a circuit controlled by said beam for operating said switch to change the direction of rotation of said motor; an escapement motor for producing a step-by-step feed of said motor; a circuit controlled by said beam for starting and stopping said escapement motor; a timer motor for regulating the feed of said escapement motor; and an electric circuit controlled by said beam for said timer motor.

63. In a weighing machine the combination of a beam; a poise; a motor for imparting a continuous feeding movement to said poise; an electric circuit for said motor; a switch in said circuit; a reverse motor for operating said switch; a circuit for said reverse motor controlled by the beam; a step-by-step mechanism including a motor and a circuit controlled by said beam; a timer motor; a circuit for said step-by-step motor having a switch controlled by said timer motor; and a circuit for said timer motor controlled by said beam.

64. In a weighing machine the combination of a beam; a poise; a motor for imparting a continuous feeding movement to said poise along the beam; means controlled by the tilting of the beam for automatically arresting the poise on its arrival at the balance point; a beam lock and a timer mechanism for automatically rendering the latter effective to lock the beam after said poise reaches the balance point.

65. In a weighing machine the combination of a beam; a poise; a motor for imparting a continuous feeding movement to said poise; means coöperating with said motor for producing rapid and slow step-by-step feeds of said poise; and electric circuit means for said step-by-step means controlled by the initial tilting of the beam to the balance point for automatically shifting from said rapid to said slow step feed.

66. In a weighing machine the combination of a beam; a poise; a motor for imparting a continuous feeding movement to said poise outward along said beam; means including an electric circuit controlled by the beam for automatically reversing said poise; and means including electric circuits controlled by the beam for automatically changing the feed from continuous to rapid and slow step-by-step movements.

67. In a weighing machine, in combination, a weighing beam adapted to tilt, a poise shaft adapted to move in accordance with the tilting movement of the beam, a motor mounted off the beam, driving connections comprising a universal joint between the motor and poise shaft adapted to transmit rotary movement to said poise shaft and permit said tilting movement thereof and a poise controlled by the movement of said shaft.

68. In a weighing machine, in combination, a weighing beam adapted to tilt, a poise-operating screw shaft adapted to move in accordance with the tilting movement of the beam, an electric motor mounted off the beam, mechanical driving connections comprising a universal joint between the motor and poise shaft adapted to transmit rotary movement to said poise shaft and permit said tilting movement thereof, and a poise controlled by the movement of said shaft.

In testimony whereof, we have signed our names to this specification, in the presence of two subscribing witnesses.

FRANK A. EMERY.
ARTHUR A. ADAMS.

Witnesses:
LOUIS L. G. DE ROCHEMONT,
CHARLES O. DANFORTH.